US012793495B2

(12) United States Patent
Walter et al.

(10) Patent No.: US 12,793,495 B2
(45) Date of Patent: Nov. 10, 2026

(54) METHOD FOR AUTHENTICATING A SECURITY DOCUMENT

(71) Applicants: KURZ Digital Solutions GmbH & Co. KG, Fürth (DE); OVD Kinegram AG, Zug (CH)

(72) Inventors: Harald Walter, Horgen (CH); Corrado Fraschina, Bonstetten (CH); Sebastian Mader, Baar (CH); Benno Schmitzer, Zirndorf (DE); Uwe Frieser, Büchenbach (DE); Hendrik Von Prince, Erlangen (DE)

(73) Assignees: KURZ Digital Solutions GmbH & Co. KG, Fürth (JP); OVD Kinegram AG, Zug (CH)

( * ) Notice: Subject to any disclaimer, the term of this patent is extended or adjusted under 35 U.S.C. 154(b) by 791 days.

(21) Appl. No.: 17/793,460

(22) PCT Filed: Jan. 14, 2021

(86) PCT No.: PCT/EP2021/050630

§ 371 (c)(1),
(2) Date: Jul. 18, 2022

(87) PCT Pub. No.: WO2021/148292

PCT Pub. Date: Jul. 29, 2021

(65) Prior Publication Data

US 2023/0062072 A1 Mar. 2, 2023

(30) Foreign Application Priority Data

Jan. 23, 2020 (DE) ..................... 10 2020 101 559.3

(51) Int. Cl.
*G07D 7/00* (2016.01)
*G07D 7/0043* (2016.01)
*G07D 7/17* (2016.01)

(52) U.S. Cl.
CPC ......... *G07D 7/0032* (2017.05); *G07D 7/0043* (2017.05); *G07D 7/17* (2017.05)

(58) Field of Classification Search
CPC ...... G07D 7/0032; G07D 7/0043; G07D 7/17; G07D 7/003; G07D 7/1205; G07D 7/00;
(Continued)

(56) References Cited

U.S. PATENT DOCUMENTS 10,019,626 B2 * 7/2018 Schilling .............. B42D 25/328
2015/0219807 A1 8/2015 Lochbihler
(Continued)

FOREIGN PATENT DOCUMENTS

CN 105934779 A 9/2016
CN 104602920 10/2016
(Continued)

OTHER PUBLICATIONS

IPhone XR. Technical Specification. Apple, 2018 [retrieved on Apr. 2, 2025]. Retrieved from the Internet: <https://support.apple.com/en-us/111868> (Year: 2018).*
(Continued)

*Primary Examiner* — Xiao Liu
*Assistant Examiner* — Alexander Joseph Vaughn
(74) *Attorney, Agent, or Firm* — HOFFMANN & BARON, LLP

(57) ABSTRACT

A method for authenticating a security document by means of at least one device includes: a) providing the security document having at least one first security element and at least one second security element; b) providing the at least one device, wherein the at least one device includes at least one sensor; c) capturing first items of optical information of the at least one first security element by means of the at least one sensor of the at least one device during a first illumination, wherein at least one first dataset specifying these
(Continued)

items of information is generated therefrom; d) capturing second items of optical information of the at least one second security element by means of the at least one sensor of the at least one device during a second illumination, wherein at least one second dataset specifying these items of information is generated therefrom; e) capturing third items of optical information of the at least one second security element by means of the at least one sensor of the at least one device during a third illumination, wherein at least one third dataset specifying these items of information is generated therefrom, wherein the second illumination differs from the third illumination; f) checking the genuineness of the security document and/or the second security element at least on the basis of the at least one second dataset and the at least one third dataset.

20 Claims, 13 Drawing Sheets

(58) Field of Classification Search
CPC .. G07D 7/0034; G07D 7/005; H04N 1/00843; H04N 1/00848; G06T 1/0021
See application file for complete search history.

(56) References Cited

U.S. PATENT DOCUMENTS

| | | | | |
|---|---|---|---|---|
| 2015/0356805 | A1* | 12/2015 | Whiteman ............ | G07D 7/026 382/135 |
| 2016/0209727 | A1* | 7/2016 | Smith .................... | H04N 23/65 |
| 2016/0307035 | A1 | 10/2016 | Schilling et al. | |
| 2018/0001690 | A1 | 1/2018 | Fuhse et al. | |
| 2018/0276931 | A1 | 9/2018 | Anand | |
| 2019/0033206 | A1 | 1/2019 | Spoettl et al. | |
| 2019/0126660 | A1 | 5/2019 | Dorier et al. | |
| 2019/0384955 | A1 | 12/2019 | Frieser et al. | |
| 2020/0215844 | A1 | 7/2020 | Amerasinghe et al. | |
| 2020/0384791 | A1 | 12/2020 | Mader et al. | |
| 2023/0062072 | A1 | 3/2023 | Walter et al. | |

FOREIGN PATENT DOCUMENTS

| | | | | |
|---|---|---|---|---|
| CN | 104602920 | B | 10/2016 | |
| DE | 10 2011 077 904 | | 12/2012 | |
| DE | 102011077904 | A1 * | 12/2012 | ............ G07D 7/121 |
| DE | 10 2013 009 474 | | 12/2014 | |
| DE | 10 2013 009 474 | A1 | 12/2014 | |
| DE | 10 2013 113 340 | | 6/2015 | |
| DE | 10 2013 113 340 | A1 | 6/2015 | |
| DE | 10 2015 116 708 | | 4/2017 | |
| DE | 10 2015 116 708 | A1 | 4/2017 | |
| DE | 10 2017 116 736 | | 12/2018 | |
| DE | 10 2017 116 736 | B3 | 12/2018 | |
| DE | 10 2017 120 536 | | 3/2019 | |
| DE | 10 2017 120 536 | A1 | 3/2019 | |
| JP | 2015-008374 | A | 1/2015 | |
| JP | 2017-032697 | A | 2/2017 | |
| JP | 2018-060133 | A | 4/2018 | |
| TW | I 576767 | | 4/2017 | |
| TW | I576767 | B | 4/2017 | |
| TW | 201919905 | | 6/2019 | |
| TW | 201919905 | A | 6/2019 | |
| WO | 2018/109035 | A2 | 6/2018 | |
| WO | WO 2018/109035 | | 6/2018 | |
| WO | 2021/148292 | A1 | 7/2021 | |

OTHER PUBLICATIONS

International Search Report and Written Opinion.
German Examination Report.
Bundesbank: "Die Euro-Banknoten", May 28, 2019 (May 28, 2019), Seiten 1-35, XP055795996, ISBN: 978-3-95729-574-3 Gefunden im Internet: URL:https://www.bundesbank.de/resource/blob/797824/5dff82cb073c7cb77aff9e643ac94a33/ml/die-euro-banknoten-data.pdf [gefunden am Apr. 16, 2021] das ganze Dokument.
EN ISO 11664-4.
Taiwanese Office Action dated Aug. 16, 2024.
Chinese Office Action of Jul. 12, 2023.
Japanese Office Action dated Nov. 26, 2024.

* cited by examiner

METHOD FOR AUTHENTICATING A SECURITY DOCUMENT

This application is a National Stage application based on an International Application filed under the Patent Cooperation Treaty, PCT/EP2021/050630, filed Jan. 14, 2021, which claims priority to DE 102020101559.3, filed Jan. 23, 2020.

BACKGROUND OF THE INVENTION

The invention relates to a method for authenticating a security document, a device, as well as a device and a security document for use in such a method.

Security documents, such as for example value documents, banknotes, passports, driver's licenses, ID cards, credit cards, tax strips, license plates, certificates or product labels, product packaging or products, often comprise security elements, in particular optically variable security elements, which fulfill the function of being able to authenticate the genuineness of such security documents with the aid of such security elements and hereby being able to protect such security documents from forgery. Such security elements can preferably generate different optical effects in different illumination situations, in particular in combination with different angles of observation and/or illumination. This also has the result that such security elements cannot be reproduced easily by photocopying, duplicating or simulating.

As a rule, such security elements have a predetermined optical design which can be verified visually by an observer, in particular using the naked eye. Here, forgeries which have a high quality and virtually do not differ from the original security element and/or security document can be recognized only very unreliably or not at all by means of a visual check, in particular by laypeople.

Further, a purely visual check is not practical in such situations when there are a large number of security documents, banknotes or products. Here, the observer needs to be able to call to mind precise knowledge of the security elements actually present in each case and their specific properties, wherein this proves to be very difficult because of the large number of existing security elements on all the possible different security documents, banknotes or products.

Systems for automatically authenticating security elements and/or security documents are known. A corresponding apparatus is described for example in DE 10 2013 009 474 A1. Here, the security element or security document is usually illuminated with a laser at a predetermined angle and the reflected light is captured at a predefined angle of observation by means of suitable sensors. These are stationary apparatuses which are designed for a high throughput of checks of security documents.

In practice, however, there is often also a need to authenticate security elements and/or security documents in situ on the spur of the moment. However, such stationary systems are not suitable for such a need.

The object of the present invention is thus to improve the authentication of security elements.

SUMMARY OF THE INVENTION

The object is achieved by a method for authenticating a security document by means of at least one device, wherein in the method the following steps are carried out, in particular in the following order:

a) providing the security document comprising at least one first security element and at least one second security element, b) providing the at least one device, wherein the at least one device comprises at least one sensor, c) capturing first items of optical information of the at least one first security element by means of the at least one sensor of the at least one device during a first illumination, wherein at least one first dataset specifying these items of information is generated therefrom, d) capturing second items of optical information of the at least one second security element by means of the at least one sensor of the at least one device during a second illumination, wherein at least one second dataset specifying these items of information is generated therefrom, e) capturing third items of optical information of the at least one second security element by means of the at least one sensor of the at least one device during a third illumination, wherein at least one third dataset specifying these items of information is generated therefrom, wherein the second illumination differs from the third illumination, f) checking the genuineness of the security document and/or the at least one second security element at least on the basis of the at least one second dataset and the at least one third dataset.

Further, the object is achieved by a security document, in particular for use in the above-mentioned method, wherein the security document has at least one first security element and at least one second security element.

Further, the object is achieved by a device, in particular for use in the above-mentioned method, wherein the device has at least one processor, at least one memory, at least one sensor, at least one output unit and at least one internal light source.

Further, the object is achieved by a use of a device, in particular the above-mentioned device, for authenticating a security document, in particular the above-mentioned security document, preferably in a method, further preferably in the above-mentioned method.

Here, it is made possible to check the authenticity of a security element or a security document independently of stationary apparatuses independently of time and location with a high level of reliability, in particular with a higher level of reliability than with visual methods. The security elements that can be authenticated with such a method, with which security documents or products are protected, and thus also the security documents or products, are particularly well protected against forgery.

By "authentication" is preferably meant a recognition of an original security element or security document and its difference from a forgery.

In particular, a security element is an optically variable security element which generates an item of optical information that is capturable for the human observer or a sensor, in particular items of optically variable information. For this, it can also be necessary to use aids, such as for example a polarizer, an objective lens or a UV lamp (UV=ultraviolet, ultraviolet light). A security element here preferably consists of the transfer ply of a transfer film, of a laminating film or of a film element, in particular in the form of a security thread. The security element here is preferably applied to the surface of the security document and/or at least partially embedded in the security document.

Further, it is possible for the security document to have not only one security element, but several security elements, which are preferably formed different and/or are introduced into the security document and/or applied to the security document differently. Security elements here can be applied to a top side of the security document over the whole surface, embedded between layers of the security document over the whole surface, but can also be applied to a top side of the security document and/or embedded in a layer of the security document only over part of the surface, in particular in the form of a strip or thread or in the form of a patch. The carrier substrate of the security document preferably has a through-hole or window region in the region of the security element, with the result that the security element can be observed optically both in reflected light from the front and back of the security document and in transmitted light.

Optically variable security elements are also known as “optically variable devices” (OVDs) or sometimes also as “diffractive optically variable image devices” (DOVIDs). They are elements which display different optical effects in the case of different observation and/or illumination conditions. An optically variable security element preferably has an optically active relief structure, for example a diffractive relief structure, in particular a hologram or a Kinegram®, a computer-generated hologram (CGH), a zero-order diffraction structure, a macrostructure, in particular a refractively acting microlens array or a microprism array or a micromirror array, a matte structure, in particular an isotropic matte structure or an anisotropic matte structure, linear or crossed sinusoidal grating structures or binary grating structures, asymmetric blazed grating structures, an overlay of a macrostructure with a diffractive and/or matte microstructure, an interference layer system, which preferably generates a color shift effect dependent on the angle of view, a volume hologram, a layer containing liquid crystals, in particular cholesteric liquid crystals and/or a layer containing optically variable pigments, for example thin-film layer pigments or liquid-crystal pigments. In particular through combinations of one or more of the above-named elements, a particularly forgery-proof OVD can be provided because a forger has to reconstruct this specific combination, which considerably increases the technical difficulty level of the forgery.

Advantageous designs of the invention are described in the dependent claims.

Preferred embodiments of the method are named below.

The at least one device in step b) is preferably selected from: smartphone, tablet, spectacles and/or PDA (PDA=“Personal Digital Assistant”), in particular wherein the at least one device has a lateral dimension in a first direction of from 50 mm to 200 mm, preferably from 70 mm to 150 mm, and/or has a second lateral dimension in a second direction of from 100 mm to 250 mm, preferably from 140 mm to 160 mm, further preferably wherein the first direction is arranged perpendicular to the second direction.

By a “device” is preferably meant any transportable device which can be held by a user while carrying out the method or carried and manually manipulated by a user. In addition to smartphones, tablets or PDAs, other devices can in particular also be used. For example, it is possible also to use devices which are constructed specifically only for carrying out this method, instead of the named multi-purpose devices.

It is possible for the first lateral dimension in the first direction and the second lateral dimension in the second direction of the at least one device in step b) to span at least one shielding surface.

Further, it is possible for the at least one shielding surface to have an outline in the plane spanned by the first direction and the second direction, in particular substantially, in particular wherein the outline is rectangular, preferably wherein the corners of the rectangular outline have a rounded shape.

In particular, the at least one shielding surface of the at least one device in step b) shields the security document and/or the at least one first security element and/or the at least one second security element from diffuse illumination and/or background illumination. This diffuse illumination and/or background illumination preferably arises from artificial and/or natural light sources which illuminate the environment in which the security document is being checked while the method is being carried out.

Further preferably, the at least one sensor of the at least one device in step b) is an optical sensor, in particular a CCD sensor (CCD=“Charged Coupled Device”), a MOSFET sensor (MOSFET=“Metal Oxide Semiconductor Field Effect Transistor”, also MOS-FET) and/or a TES sensor (TES=“Transition Edge Sensor”), preferably a camera.

As a rule, the sensor used is preferably a digital electronic sensor, for example a CCD sensor. Preferably, CCD arrays are used, i.e. CCD arrangements in which individual CCDs are arranged in a two-dimensional matrix. The individual images generated by such a sensor are preferably present in the form of a pixel matrix, wherein each pixel corresponds in particular to an individual CCD of the sensor. The CCD sensor preferably has separate sensors for the colors red, green and blue (RGB) in each case, whereby these individual colors or mixed colors thereof are particularly easy to detect.

It is possible for the at least one sensor of the at least one device in step b) to have a distance and/or an average distance and/or minimum distance from the outline of the at least one shielding surface, which lies in particular in the plane spanned by the first direction and the second direction, of from 3 mm to 70 mm, preferably from 4 mm to 30 mm and in particular from 5 mm to 10 mm.

Further, it is possible for the at least one device in step b) to comprise at least one internal light source, in particular a camera flash, preferably an LED (LED=“light emitting diode”) or a laser.

Here, it is possible for the internal light source of the device to emit light for a third illumination which comprises one or more spectral regions of the following spectral regions, in particular selected from the group: IR region (IR=infrared, infrared light) of electromagnetic radiation, in particular the wavelength range from 850 nm to 950 nm, VIS region (VIS=light visible to the naked human eye) of electromagnetic radiation, in particular the wavelength range from 400 nm to 700 nm, and UV region of electromagnetic radiation, in particular from the wavelength range from 190 nm to 400 nm, preferably from the range 240 nm to 380 nm, further preferably from the range 300 nm to 380 nm.

It is further possible for the at least one sensor of the at least one device in step b) to have a distance and/or an average distance from the at least one internal light source of the at least one device of from 5 cm to 20 cm, in particular from 6 cm to 12 cm.

The at least one device in step b) preferably comprises at least one output unit, in particular an optical, acoustic and/or haptic output unit, preferably a screen and/or display.

Further, it is possible for the device to output an item of information about the genuineness, in particular an estimation regarding the genuineness, of the security element or the security document, preferably by means of the at least one output unit. The estimation regarding the genuineness of the security element will be output by the reader, preferably as a probability and/or confidence level which preferably quantifies the estimation regarding the genuineness, in particular the genuineness.

Furthermore, it is possible for the method to comprise the following further step, in particular between steps b) and c):

b1) outputting instructions and/or items of user information before and/or during the capture of the first, second and/or third items of optical information of the at least one first or second security element in steps c), d) or e) to a user by means of the at least one device, in particular by means of the at least one output unit of the at least one device, from which the user preferably infers a predetermined relative position or relative position change or relative position progression, a predetermined distance, in particular the distance h, or distance change or distance progression and/or a predetermined angle or angle change or angle progression between the at least one device and the security document and/or the at least one first and/or the at least one second security feature during the capture of the first, second and/or third items of optical information.

The method preferably comprises the following further step, in particular between steps b) and c) and/or c) and d):

b2) outputting instructions and/or items of user information before and/or during the capture of the second and/or third items of optical information of the at least one first or second security element in steps d) or e), at least on the basis of the at least one first dataset and/or the at least one second dataset, to a user by means of the at least one device, in particular by means of the at least one output unit of the at least one device, from which the user preferably infers a predetermined relative position or relative position change or relative position progression, a predetermined distance, in particular the distance h, or distance change or distance progression and/or a predetermined angle or angle change or angle progression between the at least one device and the security document and/or the at least one first and/or the at least one second security feature during the capture of the second and/or third items of optical information.

It is possible for the device in step d) and/or e) to be arranged at any desired angle to the second security element and/or the security document, in particular wherein the device determines the above-mentioned angle on the basis of the geometry of the second security element. Once the angle between the device and the second security element and/or the security document has been determined, the user is preferably prompted to move the device. The device here comprises in particular a motion sensor, with which it is possible to capture this movement of the device. The sensor here preferably captures an alteration of the second and/or third items of optical information, in particular of the border and/or a motif, of the second security element, in particular wherein the device sets this alteration in relation to the above-mentioned movement.

It is further possible for the device to be moved by the user alternately in two directions running parallel to one another and/or contrary to one another, in particular to the left and to the right. Here, it is possible for this movement to be measured by the device and to be set in relation to the alteration of the second and/or third items of optical information of the second security element.

Further, it is possible for the distance between the device and the second security element and/or security document to be set, in particular wherein the device is moved towards the second security element and/or security document or is moved away from the second security element and/or security document. Here, it is possible for this movement to be measured by the device and to be set in relation to the alteration of the second and/or third items of optical information of the second security element.

It is furthermore possible for a check of the second and/or third items of optical information, in particular the border and/or a motif, of the second security element to be carried out by means of the third illumination, preferably emitted by the internal light source of the device, and the eyes of the user. Here, it is possible for the device to display to the user, via the output unit, items of information and/or instructions, from which the user in particular deduces how the device is to be moved and what alterations of the second and/or third items of optical information of the second security element are to be expected.

It is possible for the first, second and/or third datasets to be images, in particular wherein the images specifies and/or comprises the respective first, second and/or third items of optical information of the first and/or second security element under the first, second and, respectively, third illumination.

In steps c), d) and/or e), it is preferably checked first of all whether the first, second and/or third items of optical information are specified by the first, second and, respectively, third datasets and are present. These first, second and/or third items of optical information can here themselves be the entire design, motif and/or the border of the first or second security element or only represent a partial aspect thereof. It is hereby ensured that the first, second and/or third datasets generally represent or specify the security element to be authenticated. If this is not the case, further examinations can be dispensed with and the user can be pointed to the fact that the images recorded by means of the sensor are not suitable for the purpose of authentication and may have to be re-recorded.

Alternatively, the user can be prompted to carry out other steps for identification or authentication. For example, the user can be prompted to record a further item of optical information of a barcode or other machine-readable regions (e.g. the MRZ (MRZ="machine readable zone") of an ID document) present, in particular printed, on the security document or a particular partial region of the packaging or a security document by means of the device and to send it to an official or commercial checking office for example for further analyses. This further item of optical information can then be linked to already present items of information and, with reference to them, still further instructions for identification or authentication can optionally be transmitted to the user, e.g. via an internet connection.

It is expedient if an image recognition algorithm, in particular a Haar cascade algorithm, is used to check whether the predefined the first, second and/or third items of optical information are present in the first, second and, respectively, third datasets. Such algorithms preferably allow a rapid and reliable classification of image contents.

The Haar cascade algorithm is based in particular on the evaluation of a plurality of so-called "Haar-like" features in the first, second and/or third datasets. These are preferably structures which are related to Haar wavelets, thus rectangular wave packets of a predefined wavelength. In two dimensions, these are preferably neighboring, alternating light and dark rectangular regions in the first, second and/or third datasets. The "Haar-like" features present are determined by moving a rectangular mask over the first, second and/or third datasets. The "Haar-like" features present are then compared with those that are supposed to be present in the first, second and/or third items of optical information to be recognized. This can be effected by a filter cascade.

However, it is also possible to use other image recognition algorithms.

The image recognition is thus advantageously based on a form of computer learning. No specific parameters with reference to which a classification of the first, second and/or third items of optical information in the first, second and/or third datasets is effected are predefined for the algorithm, rather the algorithm learns these parameters with reference to the training dataset.

To record the training dataset, a plurality of datasets are preferably created, wherein a first partial quantity of the datasets in each case has the predefined item of optical information and a second partial quantity of the datasets in each case does not have the predefined item of optical information, and wherein each dataset of the first partial quantity is allocated all the respective parameters of the items of optical information to be recognized, in particular a pattern, motif and/or the border, of the predefined security element.

A training of the image recognition algorithm is then preferably carried out with reference to the first and second partial quantities as well as the allocated parameters. The algorithm hereby learns to classify the datasets correctly and to ignore any disruptive factors that may have been introduced into the training dataset, such as for example optical reflections in the datasets, random shadows or the like. A rapid and reliable image recognition is hereby made possible.

Compared with the above-described simple image recognition, which only delivers a yes/no classification or a probability statement as to whether the predefined pattern, motif and/or border is present in the dataset, additional items of information are thus provided. In particular, the presence or absence of detailed patterns, motifs and/or the border of the security element can be checked with reference to the contour determined. This delivers further items of information which can contribute to the authentication of the security element.

The predefined item of information which is used for the authentication can thus relate to only one detail of the entire security element and/or security document. This makes it possible also to hide visually recognizable security elements as it were in the design of the security document.

An edge recognition algorithm, in particular a Canny algorithm, is preferably performed to determine the contour. The Canny algorithm is in particular a particularly robust algorithm for edge detection and delivers rapid and reliable results.

For the application of the Canny algorithm to datasets comprising items of color information, it is advantageous to transform them first of all into grayscales. In grayscale images, edges are distinguished in particular by strong fluctuations in lightness, i.e. a contrast, between neighboring pixels and can thus be described as discontinuities in the grayscale function of the image.

By "contrast" is meant in particular a difference in lightness and/or a difference in color. In the case of a difference in lightness, the contrast is preferably defined as follows:

$$K=(L_{max}-L_{min})/(L_{max}+L_{min}),$$

in particular wherein $L_{max}$ and $L_{min}$ correspond to the lightnesses of the background of the security document or, respectively, the security element or vice versa, depending on whether the lightness of the security element or of the background of the security document is lighter. The values of the contrast preferably lie between 0 and 1.

By "background of the security document" is meant here in particular one or more regions of the security document which preferably do not have the first and/or the second security element.

Alternatively, it is possible for a contrast with respect to a difference in lightness to be defined in the following manner:

$$K=(L_{background}-L_{security\ element})/(L_{background}+L_{security\ element}).$$

The corresponding value range for the contrast K here preferably lies between −1 and +1. An advantage of this definition is in particular that a "contrast reversal" also has a change of sign.

When the edge recognition algorithm is performed, an edge detection is preferably carried out by applying a Sobel operator in at least one preferred direction of the at least one dataset, preferably in two orthogonal preferred directions of the at least one dataset.

The Sobel operator is a convolution operator, which acts in particular as a so-called discrete differentiator. Through the convolution of the image with the Sobel operator, the partial derivatives of the grayscale function in the two orthogonal preferred directions are obtained. From this, it is possible to determine the edge direction and edge thickness.

It is further preferred if an edge filtering is carried out when the edge recognition algorithm is performed. This can be effected for example by means of a so-called "non-maximum suppression", which ensures that only the maxima along one edge are preserved, with the result that an edge perpendicular to its direction of extent is not wider than one pixel.

Furthermore, a threshold-based determination of the image coordinates of the contour of the object is preferably carried out when the edge recognition algorithm is performed. The edge thickness from which a pixel is to be included in an edge is thus determined.

For example, a hysteresis-based method can be used for this. For this, two threshold values T1 and T2 are defined, wherein T2 is greater than T1. A pixel with an edge thickness greater than T2 is regarded as a constituent of an edge. All pixels with an edge thickness greater than T1 connected to this pixel are likewise ascribed to this edge.

The image coordinates of all pixels belonging to an edge of the object in the individual image examined are thus obtained. These can be analyzed further, for example in order to recognize simple geometric shapes.

These predefined contours can correspond to the predefined item of optical information, with the result that an accurate check of the dataset for a match to the item of optical information of the genuine security element becomes possible.

In order to authenticate a security element checked in such a way as genuine, there need not necessarily be an absolute match. It is further possible to predefine tolerance ranges for allowable deviations. Deviations need not necessarily indicate a forgery, as optical artifacts, perspective distortions, wear and tear or dirtying of the security element in use or similar effects which can occur during the capture of the items of optical information and/or the generation of the dataset can also adversely affect the match to the reference dataset of the original. In order to reduce such deviations, it is advantageous if aids are provided in order to make it easier for the user to carry out the method. For example, one or more orientation frames, in which the security element or parts of the motif, pattern and/or the border are placed for the recognition, can be displayed on the output unit of the device. As an alternative or supplement, further optical aids or displays can be provided in order to reduce, for example, perspective distortions and/or twisting. For example, these can be movable crosshairs or other elements which are to be positioned relative to one another by means of movement of the device. Although this makes it more difficult for the user to operate the device, it can improve the recognition rate for the security element.

It is possible for the at least one sensor of the at least one device and/or the at least one device in steps c), d) and/or e) to have a distance h and/or an average distance from the security document and/or the at least one first security element and/or the at least one second security element of from 20 mm to 150 mm, in particular from 50 mm to 130 mm, preferably from 60 mm to 125 mm.

By "close-up limit" is meant in particular the minimum separation between the security document and/or the first and/or second security element and the device and/or the sensor. The minimum separation up to which the security element is still detectable or capturable by the sensor is relevant here in particular. There is detectability or capturability of the security element when the close-up limit, in particular the distance from camera to security element, is 50 mm for example. In the example case where the device is aligned parallel to the security element and all of the strong light sources are arranged orthogonal to the shielding surface of the device, the respective sensor is not capable, in particular below the close-up limit, of focusing on the security document and/or the first and/or second security element. The far range can be disregarded here as a maximum possible focusability is not advantageous in the present case. On the one hand a complete or at least as large as possible a shielding against the diffuse second illumination and/or the background light and/or the ambient light through the device can no longer be effected in the case of an expansion of the focus range, on the other hand the security feature in particular in the region covered by the sensor, in particular in a sensor image or camera image, becomes too small from a distance of 150 mm in order still to be reliably capturable.

The at least one shielding surface of the at least one device and/or the at least one device in steps c), d) and/or e) preferably has a distance h and/or an average distance from the security document and/or the at least one first security element and/or the at least one second security element of from 20 mm to 150 mm, in particular from 50 mm to 130 mm, preferably from 60 mm to 125 mm.

Further, it is possible for the first, second and/or third items of optical information of the at least one first or second security element in steps c), d) or e) to be captured by means of the at least one sensor of the at least one device.

It is furthermore possible for the first illumination during the capture of the first items of optical information of the at least one first security element in step c) to be diffuse or to be directed or to have diffuse and directed portions and/or to be background illumination.

In particular, the second illumination during the capture of the second items of optical information of the at least one second security element in step d) is diffuse, in particular wherein the diffuse second illumination comprises diffuse portions of the light of at least one external light source in the environment of the security document and/or of the at least one second security element, in particular at a distance of at least 0.3 m, preferably 1 m, further preferably 2 m, from the security document and/or from the at least one second security element, and/or in particular wherein the diffuse second illumination comprises ambient light and/or background light.

It has proved to be worthwhile that the at least one device and/or the at least one shielding surface of the at least one device is arranged during the capture of the second items of optical information of the at least one second security element in step d) such that the at least one device and/or the at least one shielding surface of the at least one device shields against at least 75%, in particular at least 90%, preferably at least 95%, further preferably at least 99%, of directed portions of the light of all external light sources in the environment of the security document and/or of the at least one second security element.

It is further possible for the at least one device and/or the at least one shielding surface of the at least one device to be arranged during the capture of the second items of optical information of the at least one second security element in step d) such that the at least one device and/or the at least one shielding surface of the at least one device shields the security document and/or the at least one second security element from at least 75%, in particular at least 90%, preferably at least 95%, further preferably at least 99%, of directed portions of the light of all external light sources at a distance of at least 0.3 m, preferably of at least 1 m, further preferably of at least 2 m.

The third illumination during the capture of the third items of optical information of the at least one second security element in step e) is preferably directed, in particular light is emitted here in a predetermined relative position or relative position change or relative position progression, at a predetermined distance, in particular the distance h, or distance change or distance progression and/or at a predetermined angle or angle change or angle progression between the at least one device and the security document and/or the at least one first and/or the at least one second security feature during the capture of the first, second and/or third items of optical information.

The directed third illumination is further preferably emitted by the at least one internal light source of the at least one device, in particular wherein the direction of propagation of the directed third illumination is aligned, in particular substantially, perpendicular to the plane spanned by the security document and/or the at least one first security element and/or the at least one second security element.

The size of the device and/or the shielding surface of the device preferably determines the shading or shielding of the second security element and/or security document. The shading effect is in particular maximal here when the device is aligned parallel and centrally over the second security element, as well as at right angles to the sensor of the device which is emitting the directed third illumination. The distance of the device from the second security element and/or security document is in particular also significant for the shading effect.

The directed third illumination is preferably emitted by the at least one internal light source of the at least one device at a solid angle smaller than or equal to 10°, in particular smaller than or equal to 5°, in particular wherein the average direction of propagation of the directed third illumination is aligned, in particular substantially, perpendicular to the plane spanned by the security document and/or the at least one first security element and/or the at least one second security element.

By "solid angle" is preferably meant here the angle which spans the light cone under which the third items of optical information are visible or capturable in the case of perpendicular illumination of the second security element and/or security document and/or the plane spanned by the security document and/or the at least one first security element and/or the at least one second security element.

The directed third illumination from the at least one internal light source of the at least one device advantageously has a luminous intensity of from 5 lumens to 100 lumens, in particular from 5 lumens to 55 lumens, preferably of 50 lumens.

By “lumen” (Latin for light) is preferably meant here the SI unit of luminous flux. In particular, it is linked to the watt (W), the unit of measurement for the radiant flux (radiant power), via a factor which takes account of the fact that the human eye has different levels of sensitivity depending on the wavelength of the light. In the case of lamps the numerical value in lumens is preferably a measure of their brightness. The numerical value in watts, on the other hand, indicates in particular how much electrical power is drawn.

For example, the luminous intensity of a camera flash of a device, in particular of a smartphone customary in the trade, when the camera flash is set at 100% is approx. 50 lumens.

The security element is preferably captured by means of the sensor of the device preferably in the case of a luminous intensity of the internal light source of the device of between 5 lumens and 15 lumens and at a distance of the reflection of the internal light source of the device from the border of the security element on the security document of between 1 mm and 20 mm, preferably between 2 mm and 10 mm.

Further, it is possible for the second items of optical information of the at least one second security element not to be captured in step e) by means of the at least one sensor of the at least one device and/or in particular wherein the third items of optical information in step e) differ from the second items of optical information in step d).

It is advantageous that the third items of optical information of the at least one second security element in step e) comprise an item of optical and/or geometric information and/or that the third items of optical information of the at least one second security element in step e) do not comprise the item of optical and/or geometric information.

The directed third illumination can in particular also be or generate a light spot on the surface of the security document and/or the second security element. The light spot can in particular have a diameter of from 1 mm to 10 mm, preferably between 3 mm and 4 mm. The luminous intensity or the brightness within the light spot is preferably adjustable and in particular depends on the optical effect of the second security element and/or on the surface properties of the security document, in particular on its brightness and/or reflectance and/or roughness.

If the security document’s type is known, then the light spot is preferably switched on or generated and, in a visual representation of the security document, preferably on the display of the device, marks the position to which the user is to move the light spot. The position of the light spot can be arranged or positioned in particular in a defined position directly neighboring the second security element, preferably can directly adjoin it and/or overlap the second security element. It is preferably arranged or positioned neighboring the second security element to the left or right, but can preferably also be arranged or positioned neighboring the second security element above or underneath the.

Datasets of the security document, such as for example the size of the security document or the position and/or the size and/or the shape of the security element, can also be stored in a database. If the security document’s type and the required data from the database are determined and known, then the light spot is preferably switched on and in particular, in a visual representation of the security document, on the display of the device, marks the position to which the user is preferably to move the light spot. The position of the light spot can be positioned or arranged in particular in a defined position directly neighboring the second security element, in particular can directly adjoin it and/or overlap the second security element. It is preferably arranged or positioned neighboring the second security element to the left or right, but can in particular also be arranged or positioned neighboring the second security element above or underneath the.

However, it is also possible for several positions and/or a sequence of light spots to be set, e.g. a circling of the second security element. Here, in particular as soon as a light spot has reached the marked point, a further instruction is preferably displayed to the user on the display of the device.

It is to be noted here that the checking of the second security element and/or security document can in particular be effected both with and without shading or shielding, preferably by the device.

The second and/or third dataset in step f) for checking the genuineness of the security document and/or the second security element is preferably subjected to an image processing and/or image editing.

Various image processing steps are described below, which are preferably used to analyze the datasets and in particular to check the genuineness of the security document and/or the security element on the basis of the second and third datasets. The different steps can be combined with one another depending on the use and can sometimes mutually require one another.

The basis of the image analysis is in particular an image preparation step, in which the image is adapted to and prepared for a feature recognition and image segmentation.

By “feature” is preferably meant here a distinctive or interesting point of a dataset, for example of an image, or image element, in particular a corner or an edge. The point can be described in particular with reference to its surrounding field and can preferably be unambiguously recognized or found.

A preferred step is the conversion of the raw datasets, preferably into a grayscale image. In the case of a grayscale image, each pixel or each image point preferably consists of a lightness value of between 0, which is allocated in particular to the color black, and 255, which is allocated in particular to the color white. If the image has only a small range of lightness values, then the image lightness can be transformed by multiplying for example the lightness value of each pixel by a factor or by performing a so-called histogram equalization. To process color images, the color channels of each image point are preferably first converted to a grayscale value or a lightness value.

For a first position determination, the available grayscale image is preferably analyzed by means of template matching.

By “template matching” is meant in particular algorithms which identify parts of a dataset, such as for example image elements captured and/or specified therein, preferably motifs, patterns and/or borders, of a security element which correspond to a predefined dataset, the so-called template. The template is preferably stored in a database. The image elements are preferably checked for a match to a reference dataset image point by image point. If the number of points, i.e. the image points and/or reference points that can be allocated by the reference dataset, is very large, then the number of reference points can be reduced, in particular by reducing the resolution of the image elements. The aim of the algorithm is preferably to find and locate the best match of the reference image within the respective dataset.

The grayscale images are preferably binarized with a thresholding in an image preparation step.

In particular, one or more threshold values are determined via an algorithm, in particular the k-means clustering algorithm. Here, the object of the k-means clustering algorithm is preferably a cluster analysis, in particular wherein pixels with a lightness value below one or more threshold values are preferably set to the color value "black" and all others are set to the color value "white". The determination of a so-called black image is in particular carried out by means of the following steps: comparing the lightness values of the image point data of the allocated dataset with a first threshold value, in particular wherein the binary value 0 and/or the color value "black" is allocated to all image points which lie below the first threshold value. The threshold value is defined in particular on the basis of items of information with respect to the recognized feature or document type which is stored in the second security element and/or security document.

A white image is preferably determined from the allocated dataset by calculation of a constant binary image. To determine the white image, the following steps in particular can be carried out: comparing the lightness values of the image points of the allocated dataset with a second threshold value, wherein the binary value 1 and/or the color value "white" is allocated to all image points which lie above the second threshold value. The first and second threshold values preferably differ from one another.

To calculate the edge image, a threshold algorithm, in particular an adaptive threshold algorithm with a large block size, can be applied to the allocated dataset. The adaptivity of the threshold algorithm here relates in particular to one or more regions of the dataset and/or one or more pixels of the dataset. This incorporates local changes in the background lightness into the calculation. It can thereby be ensured that the edges present are correctly recognized.

To generate the threshold image, the following calculations are carried out:

calculation of an edge image from the allocated dataset,
calculation of a black image from the allocated dataset,
calculation of a white image from the allocated dataset.

The steps can be carried out in the specified sequence as well as in one deviating therefrom. Furthermore, the calculation of the threshold image is effected by combining the edge image, the black image and the white image.

An edge image is preferably first multiplied by the black image on an image point or pixel level. As a result of this, all black regions of the black image are now also black in the edge image, in particular wherein a black edge image is generated. In a further step, the black edge image and the white image are preferably added together. As a result of this, in particular, all image points or pixels which are white in the white image are now also white in the black edge image. The result is preferably a threshold image.

The first and/or the second threshold value can be set depending on the recognized document types, on the recognized illumination and/or the spectral range of the light of the second and/or third illumination. As a result of this, it is possible to adapt the threshold value precisely to the respective situation and thus preferably to be able to carry out a best possible check.

The threshold images present can be further prepared and/or segmented for a recognition of details by means of various filters in further image editing steps.

In the case of the use of filters, in particular, the image points are manipulated depending on the neighboring pixels. The filter preferably acts like a mask, in which in particular the calculation of an image point is specified depending on its neighboring image points.

In particular, a low-pass filter is used. The low-pass filter preferably ensures that high-frequency or high-contrast value changes, such as for example image noise or hard edges, are suppressed. As a result of this, the respective second or third datasets specifying the second or third items of optical information of the second security element become in particular washed-out or blurred and look less sharp. For example, locally large contrast differences are thus modified into respectively locally small contrast differences, e.g. a white pixel and a black pixel neighboring it become two differently gray or even identically gray pixels.

Furthermore, bilateral filters can also be used. This is preferably a selective soft-focus lens or low-pass filter. As a result of this, in particular, extensive regions of the second or third datasets specifying the second and/or third items of optical information of the second security element are in soft focus with average contrasts, but at the same time strongly contrasting region or motif edges are obtained. In the case of the selective soft focus, lightness values of image points from the neighborhood of a starting image point are preferably fed into the calculation depending not only on their separation but preferably also on their contrast. The median filter represents a further possibility for noise suppression. This filter also obtains contrast differences between neighboring regions, while it reduces high-frequency noise.

There is also a range of filters other than those described here, such as e.g. the Sobel operator, the Laplacian filter or filtering within a frequency domain into which the dataset has previously been transferred. Filtering in the frequency domain (the transformation is usually carried out by means of "Fast Fourier Transformations" (FFTs)) offers advantages such as an increase in efficiency during the image processing.

Filters and filter operations are preferably also used for edge analysis and edge detection and/or removal of image interferences and/or smoothing and/or reduction of signal noise.

To recognize and discover details, the pretreated datasets are preferably divided or segmented into meaningful regions.

A segmentation can preferably be based on an edge detection by means of algorithms which recognize edges and object transitions. High-contrast edges can be located within a dataset using various algorithms.

These include, among other things, the Sobel operator. The algorithm preferably utilizes a convolution by means of a convolution matrix (kernel), which generates a gradient image from the original image. With it, high frequencies are preferably represented with grayscale values in the image.

The regions of the greatest intensity are present in particular where the lightness of the original dataset changes the most and thus represents the largest edges. The direction of progression of the edge can also be determined with this method.

The Prewitt operator, which unlike the Sobel operator preferably does not additionally weight the image row or image column being considered, functions similarly.

If the direction of the edge is not relevant, the Laplacian filter can be applied, which approximates the Laplace operator. This generates in particular the sum of the two pure or partial second derivatives of a feature.

If only exact pixel edges are sought, and not the thickness of the edge, then in particular the Canny algorithm is appropriate, which preferably marks contours. A further segmentation is preferably effected by means of feature detectors and feature descriptors, wherein preferably the "accelerated-KAZE" (A-KAZE) algorithm (kaze=Japanese for wind) is applied. A-KAZE is in particular a combination of feature detector and feature descriptor.

In a first step, distinctive points in the image elements of the reference dataset, which is preferably stored in a database, and in the image elements to be verified of the second and/or third datasets are preferably sought by means of the A-KAZE algorithm on the basis of several different image filters. These points are described in particular with reference to their environment using the A-KAZE algorithm. A feature described using the A-KAZE algorithm advantageously consists of an encoded, but unique quantity of data, in particular with a defined size or length and/or the coordinates.

A feature matcher, preferably a Brute-Force matcher, then advantageously compares the descriptions of the features to be compared in the two image elements and forms pairs of features the description of which almost or completely match. From this comparison, a result value can then be calculated, which is a measure of the match of the two features. Depending on the size of the result value, a decision is possible as to whether the features are sufficiently similar or not.

Depending on the matching method, an upstream preselection or alternatively a point-by-point analysis, which can, however, be very time-consuming, can also take place. The transformation, thus the scaling, displacement, stretching, etc., between the two images or image elements can preferably be calculated from the matching features. In principle, however, it is also conceivable that the BRISK algorithm (BRISK=Binary Robust Invariant Scalable Keypoints) or the SIFT algorithm (SIFT=Scale-Invariant Feature Transform) is used as algorithm.

To approximate or come close to the shape and position of an image element, enveloping bodies, in particular envelope curves, are preferably used in a further image editing step.

In the simplest case, this can be a bounding box, an axis-parallel rectangle, in particular a square, which encloses the image element and/or feature. Likewise, a bounding rectangle can be used, which unlike the bounding box need not be axis-parallel, but can be rotated. Furthermore, a bounding ellipse can be used. A bounding ellipse can approximate round image elements or image elements with a round border, in particular image elements having a curvature, better than a rectangle and is defined via center, radius and angle of rotation. More complex image elements can be approximated by means of a convex envelope or an enveloping polygon. However, the processing of these image elements requires much more computing time than in the case of simple approximations. Because of the computing effort, therefore, in each case as simple as possible an image element is preferably used here.

One or more of the following steps are preferably carried out in order to check the genuineness of the second security element and/or security document on the basis of the second and/or third datasets created:

1. Converting the second and/or third datasets, in particular as raw images, into one or more grayscale images and/or color images and thresholding, in particular calculating one or more threshold images, and/or color preparation.
2. Comparing the second and/or third datasets, in particular raw, grayscale, color and/or threshold images, with one or more templates for verification, preferably by means of template matching.
3. Edge detection in each case in one or more of the second and/or third datasets, in particular raw, grayscale, color and/or threshold images.
4. Finding the position of one or more image elements in the second and/or third datasets, in particular in raw, grayscale, color and/or threshold images, via enveloping bodies and/or segmentation and/or recognition of one or more of the image elements by means of one or more feature detectors and/or feature descriptors.
5. Comparing one or more grayscale values and/or color values in each case of one or more of the image elements, in particular raw, grayscale, color and/or threshold images, with grayscale values and/or color values stored in a database.
6. Comparing the second and/or third datasets, in particular of two or more of the raw, grayscale, color and/or threshold images, to which in each case one or more, in particular all, of steps 1 to 5 have been applied. Comparing the displacements of one or more of the image elements in second and/or third datasets, in particular in raw, grayscale, color and/or threshold images, in each case by means of one or more bounding boxes or similar further methods.

Further, it is possible to carry out a comparison of the lightness values of overlays of the second and/or third datasets, in particular raw, grayscale, color and/or threshold images, and one or more possible further image analyses.

It is possible for the algorithms, in particular the image recognition algorithms, to be at least partially adapted such that individual parameters which can have a negative effect on the detectability are compensated for up to a certain degree. For example, an insufficient shielding of the second security element can be compensated for to a certain extent in step e). Should the second security element, because of insufficient shielding, for example still be capturable before activation of the third illumination, the exposure time for example of a camera as sensor can be reduced via a further algorithm until the second security element is no longer capturable without the light from the internal light source of the device or under the third illumination.

Further, it is advantageous that the method, in particular step f), comprises the following further step:

f1) outputting instructions and/or items of user information before and/or during the checking of the genuineness of the security document and/or of the at least one second security element, at least on the basis of the at least one second dataset and the at least one third dataset, to a user by means of the at least one device, in particular by means of the at least one output unit of the at least one device, from which the user preferably comprehends the differences present or not present between the at least one second dataset or the second items of optical information and the at least one third dataset or the third items of optical information.

The at least one first security element in step a) is preferably selected from: barcode, QR code, alphanumeric characters, numbering, hologram, print or combinations thereof.

Further, it is possible for the at least one second security element in step a) to comprise at least asymmetrical structures, holograms, in particular computer-generated holograms, micromirrors, matte structures, in particular anisotropic scattering matte structures, in particular asymmetrical sawtooth relief structures, kinegram, blazed gratings, diffraction structures, in particular linear sinusoidal diffraction gratings or crossed sinusoidal diffraction gratings or linear single- or multi-step rectangular gratings or crossed single- or multi-step rectangular gratings, mirror surfaces, microlenses, and/or combinations of these structures.

The optically active structures or volume holograms of the structures of the security element can in particular be adapted such that individual parameters which have a negative effect on the detectability are compensated for up to a certain degree. Thus, tests have advantageously shown that either the motifs, patterns and/or the borders of the first and/or second security elements are applied in the smallest possible size and/or that the first and/or second security element is preferably applied over a relatively large surface area.

Furthermore, in the case of computer-generated holograms, by reducing the virtual height of the third items of optical information and/or by reducing the solid angle at which the third items of optical information are capturable or detectable, it is possible to compensate for the negative influences of the roughness of the surface of the first and/or second security element and/or of the security document and/or of the substrate of the first and/or second security element and/or of the security document.

By "virtual" is meant here in particular "computer-simulated". For example, the virtual hologram plane is a hologram plane which is simulated by a computer. Such computer-simulated holograms are also called computer-generated holograms (CGHs).

By "virtual hologram plane" is meant a plane in a virtual space, in particular a three-dimensional space, which is determined by the coordinate axes x, y, z. The coordinate axes x, y, z are preferably arranged orthogonal to one another, whereby each of the directions determined by the coordinate axes x, y, z is arranged perpendicular, i.e. at a right angle, to one another. In particular, the coordinate axes x, y, z have a common coordinate origin at the virtual point (x=0, y=0, z=0). The virtual hologram planes ($x_h$, $y_h$) are determined by the surface area (x=$x_h$, y=$y_h$, z) in the virtual space, in particular as one-dimensional or two-dimensional partial bodies of the virtual space (x, y, z), in particular of the three-dimensional virtual space. Z can be zero or can also assume values different from zero.

The virtual space determined by the coordinate axes x, y, z and/or x=$x_h$, y=$y_h$ or the virtual hologram planes consist in particular of a plurality of discrete virtual points ($x_i$, $y_i$, $z_i$) or ($x_h$, $y_h$), wherein the index i or the index h is preferably chosen from a subset of the natural numbers.

By "virtual height" is meant in particular the distance, in particular the Euclidean distance, between a point ($x_i$, $y_i$, $z_i$) in the virtual space and a point ($x_h$, $y_h$, $z_h$=0) in the virtual hologram plane.

It is further possible for the degree of lightness of a color to be determined for example via the lightness value L of the L*a*b color space. By the "L*a*b color space" is meant here in particular a CIELAB color space or a color space according to ISO standard EN ISO 11664-4, which preferably has the coordinate axes a*, b* and L*. Such a color space is also called "L*a*b* chromatic space". However, the use of another color space is also conceivable, such as for example the use of the RGB or HSV color space.

Preferably, the minimum surface area of the second security element, which in particular lies in the plane spanned by the security document, is, preferably substantially, 2 mm×2 mm, in particular 4 mm×4 mm, preferably 6 mm×6 mm, or has a diameter of at least 2 mm.

The shape of the second security element is preferably selected from: circle, oval, triangle, quadrangle, pentagon, star, arrow, alphanumeric character, icon, country outline, or combinations thereof, in particular wherein the shape is easily detectable or capturable.

Tests have shown that the more complex the shape or the borders of the second security element is or are, the larger the surface area of the second security element must preferably be in order that a sufficiently large, coherent surface area is available for the detection or capture of the third items of optical information. For example, the third items of optical information of a security element the shape of which contains points of a star shape are only poorly detectable or capturable.

The size of the second security feature, which in particular generates the third items of optical information under the third illumination, is preferably at least 1 mm×1 mm, in particular at least 3 mm×3 mm, preferably at least 5 mm×5 mm.

Individual elements of the second security element, such as for example letters, country codes and icons, which generate the third items of optical information under the third illumination, preferably have a minimum line thickness of 300 μm, in particular of at least 500 μm, preferably of at least 1 mm. For example, elements of the second security element, such as individual letters with clear edges or borders, for example the letter "K" or symbols such as for example the number "5", are easily detectable or capturable.

According to the invention, the elements and/or image elements can be, among other things, graphically designed borders, figurative representations, images, visually recognizable design elements, symbols, logos, portraits, patterns, alphanumeric characters, text, colored designs.

It is possible for the second security element to be integrated in a predefined region of the design of a further security element, for example the letter "K" can be embedded at least overlapping as a second security element in a further security element in the form of a cloud. Further, it is possible for the second security element to be present in the entire design of the background of the security document, in particular in a gridding. Depending on the size of the design, this can be in particular an endlessly repeating pattern or sample.

In particular, the third item of optical information of the second security element, which is generated under the third illumination, is not provided a further time either in the further security element or in a printed region of the security document to be protected. This has the advantage that the algorithms, in particular the image recognition algorithms, the items of information possibly generated by the further security element under illumination are not inadvertently identified as the third items of optical information generated by the second security element under the third illumination.

In particular, the distance, in particular in the plane spanned by the security document, between the second security element and the further security element is at least 20 mm, preferably at least 30 mm.

In particular, the at least one first, second and/or third dataset in steps c), d), e), f) and/or f1) comprises an image sequence comprising at least one individual image of the at least one first or second security element.

The image sequence preferably comprises a plurality of individual images of the security element, in particular more than two individual images of the security element. Furthermore, it is preferred if each individual image has more than 1920×1280 pixels, in particular more than 3840×2160 pixels.

The image sequence can be a plurality of discretely created individual images which are not temporally connected, but it can also be a film, thus consist of individual images which are recorded at a predefined time interval, in particular with a frame rate of from 5 to 240 images per second.

Preferred embodiments of the security document are named below.

The security document is advantageously selected from: value documents, banknotes, passports, driver's licenses, ID cards, credit cards, tax strips, license plates, certificates or product labels, product packaging or products comprising a security element according to this invention.

Further, it is advantageous that the at least one second security element comprises at least asymmetrical structures, holograms, in particular computer-generated holograms, micromirrors, matte structures, in particular anisotropic scattering matte structures, in particular asymmetrical sawtooth relief structures, kinegram, blazed gratings, diffraction structures, in particular linear sinusoidal diffraction gratings or crossed sinusoidal diffraction gratings or linear single- or multi-step rectangular gratings or crossed single- or multi-step rectangular gratings, mirror surfaces, microlenses, and/or combinations of these structures.

Preferred embodiments of the device are named below.

It is advantageous that the at least one device is selected from: smartphone, tablet, spectacles and/or PDA (PDA="Personal Digital Assistant"), in particular wherein the at least one device has a lateral dimension in a first direction of from 50 mm to 200 mm, preferably from 70 mm to 100 mm, and/or has a second lateral dimension in a second direction of from 100 mm to 250 mm, preferably from 140 mm to 160 mm, further preferably wherein the first direction is arranged perpendicular to the second direction.

Further, it is advantageous that the first lateral dimension in the first direction and the second lateral dimension in the second direction of the at least one device span at least one shielding surface.

It is possible for the at least one shielding surface to have an outline in the plane spanned by the first direction and the second direction, in particular substantially, in particular wherein the outline is rectangular, preferably wherein the corners of the rectangular outline have a rounded shape, in particular wherein the at least one shielding surface of the at least one device shields against diffuse illumination and/or background illumination.

Further, it is possible for the at least one sensor of the at least one device to be an optical sensor, in particular to be a CCD sensor, a MOSFET sensor and/or a TES sensor, preferably to be a camera.

It is further possible for the at least one sensor of the at least one device to have a distance and/or an average distance and/or minimum distance from the outline of the at least one shielding surface, which lies in particular in the plane spanned by the first direction and the second direction, of from 3 mm to 70 mm, preferably from 4 mm to 30 mm and in particular from 5 mm to 10 mm.

The at least one device advantageously comprises at least one internal light source, in particular a camera flash, preferably an LED, in particular wherein the at least one sensor of the at least one device has a distance and/or an average distance from the at least one internal light source of the at least one device of from 5 cm to 20 cm, in particular from 6 cm to 12 cm.

In particular, the at least one device comprises at least one output unit, in particular an optical, acoustic and/or haptic output unit, preferably a screen and/or display.

BRIEF DESCRIPTION OF THE DRAWINGS

The invention is explained by way of example below with reference to several embodiment examples with the aid of the attached drawings. There are shown in.

DETAILED DESCRIPTION

Figure 1:
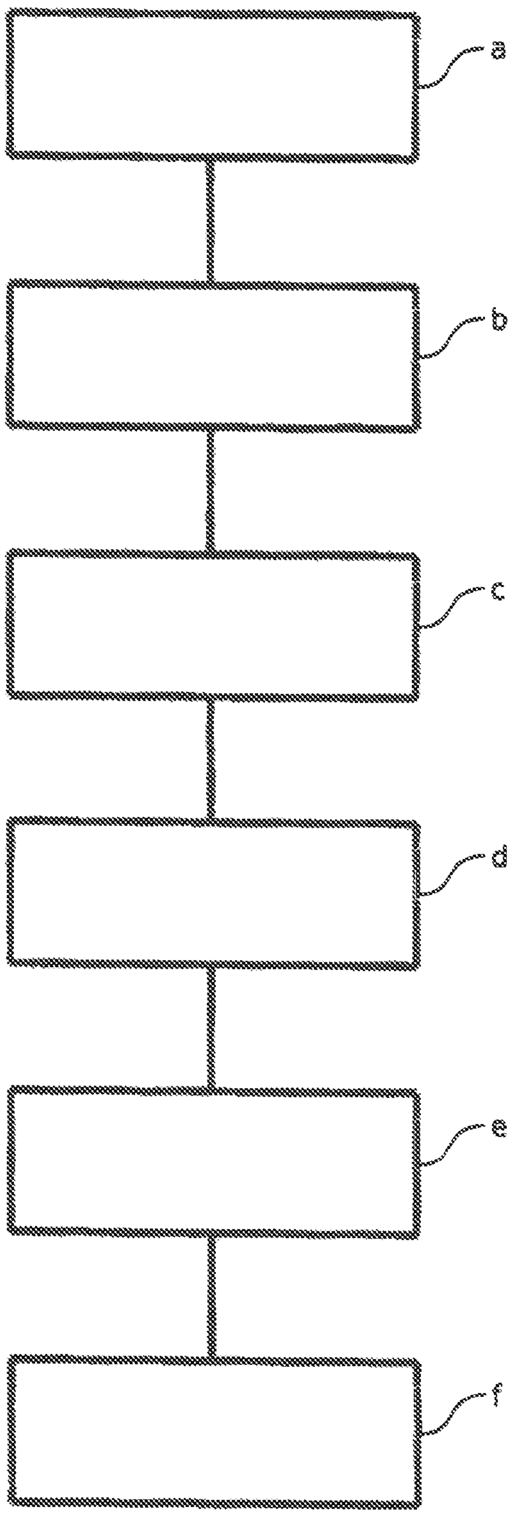
FIG. 1 a schematic representation of a method

FIG. 1 shows a method for authenticating a security document 1 by means of at least one device 2, wherein in the method the following steps are carried out, in particular in the following order:

a providing the security document 1 comprising at least one first security element 1*a* and at least one second security element 1*b*, b providing the at least one device 2, wherein the at least one device 2 comprises at least one sensor 20, c capturing first items of optical information of the at least one first security element 1*a* by means of the at least one sensor 20 of the at least one device 2 during a first illumination, wherein at least one first dataset specifying these items of information is generated therefrom, d capturing second items of optical information of the at least one second security element 1*b* by means of the at least one sensor 20 of the at least one device 2 during a second illumination, wherein at least one second dataset specifying these items of information is generated therefrom, e capturing third items of optical information of the at least one second security element 1*b* by means of the at least one sensor 20 of the at least one device 2 during a third illumination, wherein at least one third dataset specifying these items of information is generated therefrom, wherein the second illumination differs from the third illumination, f checking the genuineness of the security document 1 and/or the at least one second security element 1*b* at least on the basis of the at least one second dataset and the at least one third dataset.

Figure 2:
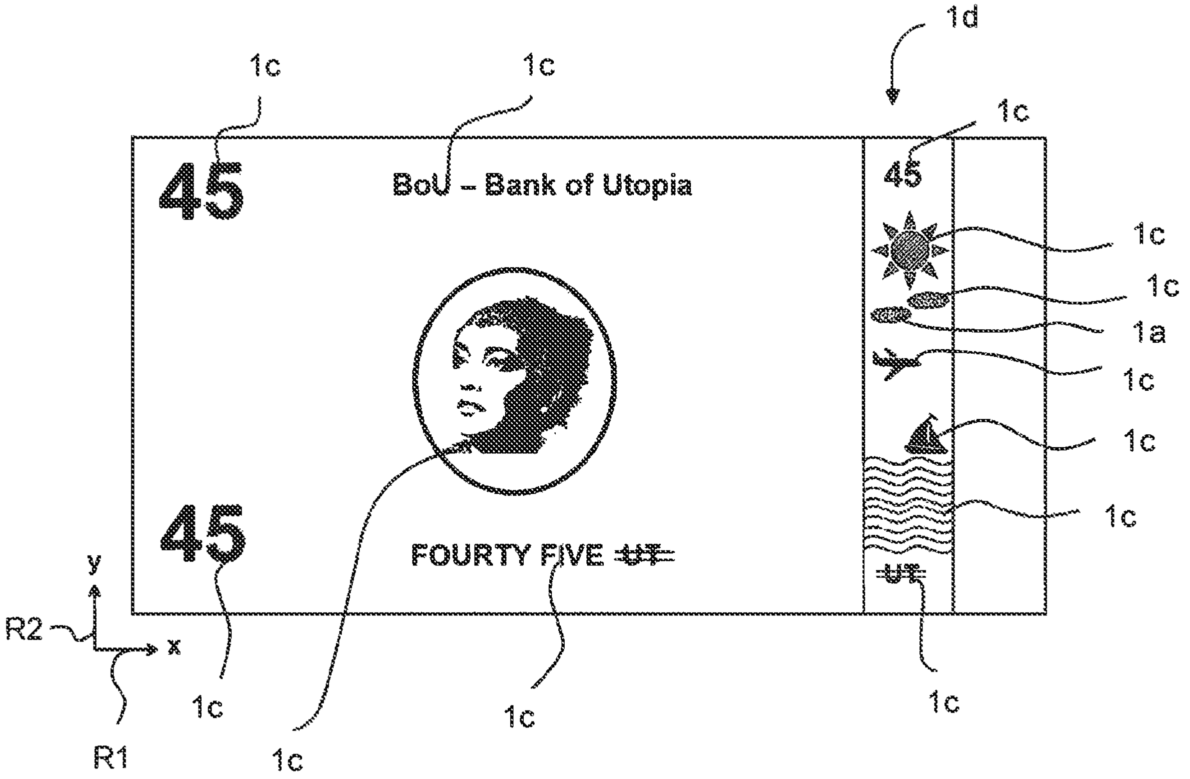
FIG. 2 a schematic representation of a security document

FIG. 2 shows a top view of a security document 1, which comprises several security elements 1*c* as well as a first security element 1*a*. The security document 1 in FIG. 2 here is a banknote comprising a foil strip 1*d*. Some of the security elements 1*c* as well as the first security element 1*a* are arranged on or in the foil strip 1*d*. The first and the second security element 1*a* and 1*b* respectively are preferably an optically variable security element.

In particular, the security document 1 is utilized for use in an above-mentioned method.

Such a security document 1 is preferably provided in step a.

Further, it is possible for the first security element 1*a* in step a to be selected from: barcode, QR code, alphanumeric characters, numbering, hologram, print or combinations thereof.

The second security element 1*b* in step a preferably comprises at least asymmetrical structures, holograms, in particular computer-generated holograms, micromirrors, matte structures, in particular anisotropic scattering matte structures, in particular asymmetrical sawtooth relief structures, kinegram, blazed gratings, diffraction structures, in particular linear sinusoidal diffraction gratings or crossed sinusoidal diffraction gratings or linear single- or multi-step rectangular gratings or crossed single- or multi-step rectangular gratings, mirror surfaces, microlenses, or combinations of these structures.

The first, second and/or third items of optical information of the first or second security element 1*a*, 1*b* in steps c, d or e are preferably captured by means of the sensor 20 of the device 2.

It is possible for the at least one first, second and/or third dataset in steps c, d, e, f and/or f1 to comprise an image sequence comprising at least one individual image of the at least one first or second security element.

A second security element is preferably integrated in the first security element 1*a*, which has the shape of a cloud.

It is alternatively possible for the shape and the print design of the security document 1 or the banknote to be the first security element 1*a*, which makes it possible to discover the position of the foil strip 1*d* relative to the second security element and thus in particular to capture the second security element through suitable evaluation of a dataset captured hereby by means of a device.

Figure 3:
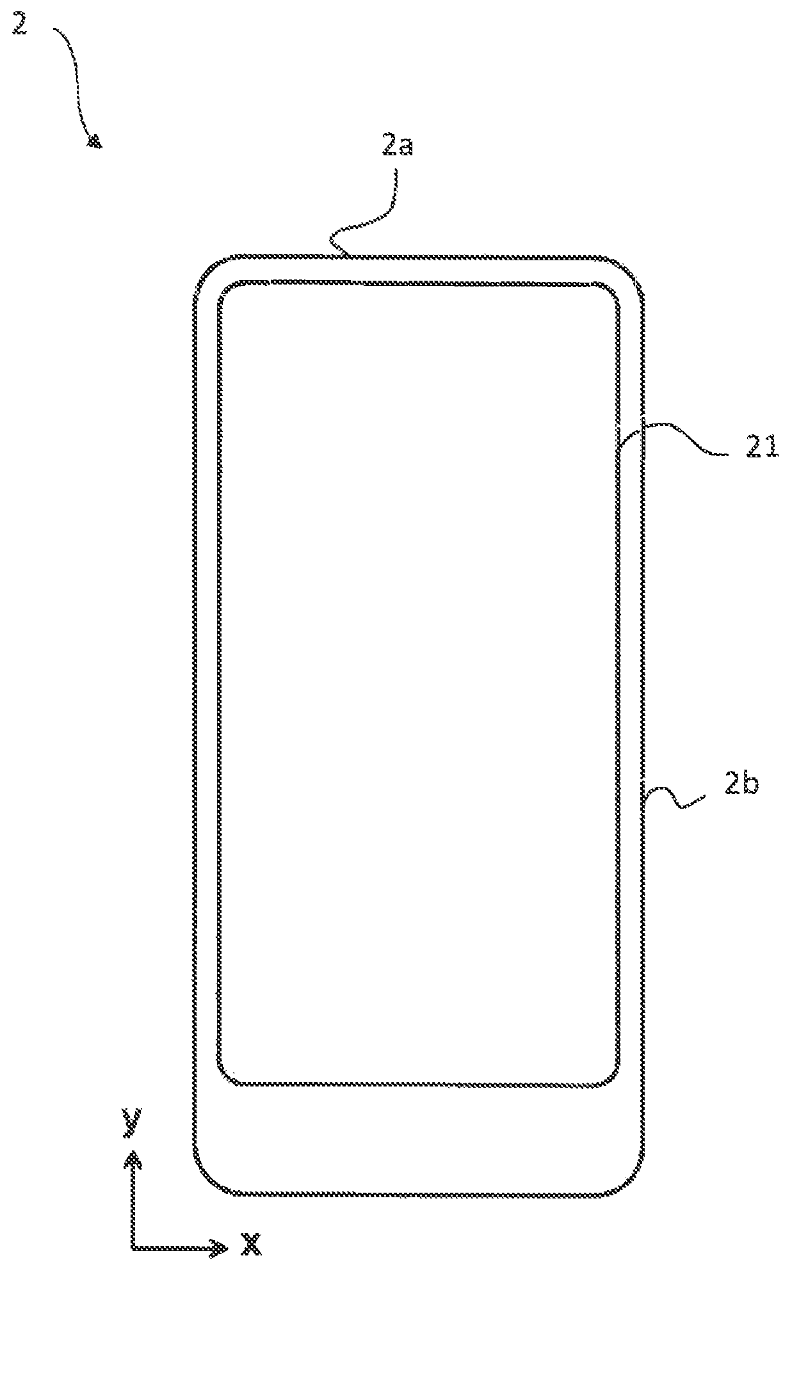
FIG. 3 a schematic representation of a device
Figure 4:
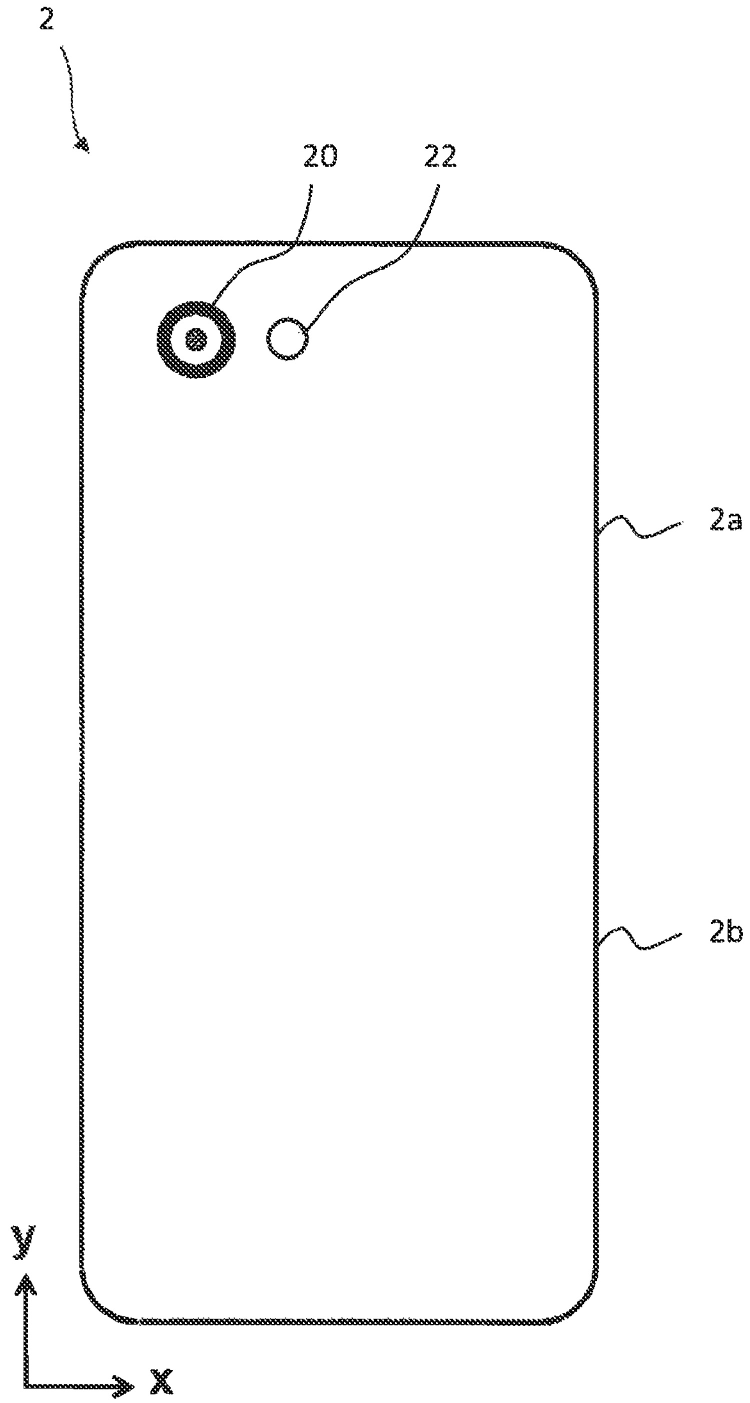
FIG. 4 a schematic representation of a device

FIGS. 3 and 4 show top views of a device 2 from two different sides, wherein such a device 2 is preferably provided in step b. The device 2 shown in FIGS. 3 and 4 is preferably a smartphone.

The above-mentioned device 2 is preferably used to authenticate an above-mentioned security document 1 in the above-mentioned method.

The device 2 shown in FIG. 3 has a shielding surface 2*a* and an output unit 21.

It is possible for the method to comprise the following further step, in particular between steps b and c:

b1 outputting instructions and/or items of user information before and/or during the capture of the first, second and/or third items of optical information of the first or second security element 1*a*, 1*b* in steps c, d or e to a user by means of the device 2, in particular by means of the output unit 21 of the device 2, from which the user preferably infers a predetermined relative position or relative position change or relative position progression, a predetermined distance, in particular the distance h, or distance change or distance progression and/or a predetermined angle or angle change or angle progression between the device 2 and the security document 1 and/or the first and/or second security feature 1*a*, 1*b* during the capture of the first, second and/or third items of optical information.

Further, it is possible for the method to comprise the following further step, in particular between steps b and c and/or c and d:

b2 outputting instructions and/or items of user information before and/or during the capture of the second and/or third items of optical information of the first or second security element 1*a*, 1*b* in steps d or e, at least on the basis of the at least one first dataset and/or the at least one second dataset, to a user by means of the device 2, in particular by means of the output unit 21 of the device 2, from which the user preferably infers a predetermined relative position or relative position change or relative position progression, a predetermined distance, in particular the distance h, or distance change or distance progression and/or a predetermined angle or angle change or angle progression between the device 2 and the security document 1 and/or the first and/or second security feature 1*a*, 1*b* during the capture of the second and/or third items of optical information.

It is possible for the device 2, in particular in step b, further to be selected from: tablet, spectacles and/or PDA.

The device 2 shown in FIGS. 3 and 4 has, in particular, a lateral dimension in a direction X of from 50 mm to 200 mm, preferably from 70 mm to 100 mm, and/or has a second lateral dimension in a direction Y of from 100 mm to 250 mm, preferably from 140 mm to 160 mm, further preferably wherein the direction X is arranged perpendicular to the direction Y.

Further, it is possible for the first lateral dimension in the direction X and the second lateral dimension in the direction Y of the device 2 to span a shielding surface 2*a*.

The device shown in FIG. 3 is characterized in that the shielding surface 2*a* has an outline 2*b* in the plane spanned by the direction X and the direction Y, in particular substantially, wherein the outline is rectangular and wherein the corners of the rectangular outline have a rounded shape.

The shielding surface 2*a* of the device 2 shown in FIGS. 3 and 4 preferably shields the security document 1 and/or the first security element 1*a* from diffuse illumination and/or directed background illumination.

Further, it is also possible for the shielding surface 2*a* of the device 2 and/or the device 2 in steps c, d and/or e to have a distance h and/or an average distance from the security document 1 and/or the first security element 1*a* and/or the second security element 1*b* of from 20 mm to 150 mm, in particular from 50 mm to 130 mm, preferably from 60 mm to 125 mm.

The output unit 21 of the device 2 shown in FIG. 3 is preferably an optical, acoustic and/or haptic output unit, in particular a screen and/or a display.

The device 2 shown in FIG. 4 has a sensor 20 and an internal light source 22.

The sensor 20 of the device 2 shown in FIG. 4 is preferably an optical sensor, in particular is a CCD sensor, a MOSFET sensor and/or a TES sensor, preferably is a camera.

It is possible for the sensor 20 of the device 2 shown in FIG. 4 to have a distance and/or an average distance and/or minimum distance from the outline 2*b* of the shielding surface 2*a*, which lies in the plane spanned by the direction X and the direction Y, of from 3 mm to 70 mm, in particular from 4 mm to 30 mm, preferably from 5 mm to 10 mm.

Further, it is possible for the internal light source 22 of the device 2 shown in FIG. 4 to comprise a camera flash, preferably an LED or a laser.

In particular, the sensor 20 of the device 2 shown in FIG. 4 has a distance and/or an average distance from the internal light source 22 of the device 2 of from 5 cm to 20 cm, in particular from 6 cm to 12 cm.

Advantageously, the first illumination during the capture of the first items of optical information of the first security element 1*a* in step c is diffuse or directed or has diffuse and directed portions and/or is background illumination.

It is possible for the device 2 to have at least one processor, at least one memory, at least one sensor 20, at least one output unit 21 and/or at least one internal light source 22.

Figure 5:
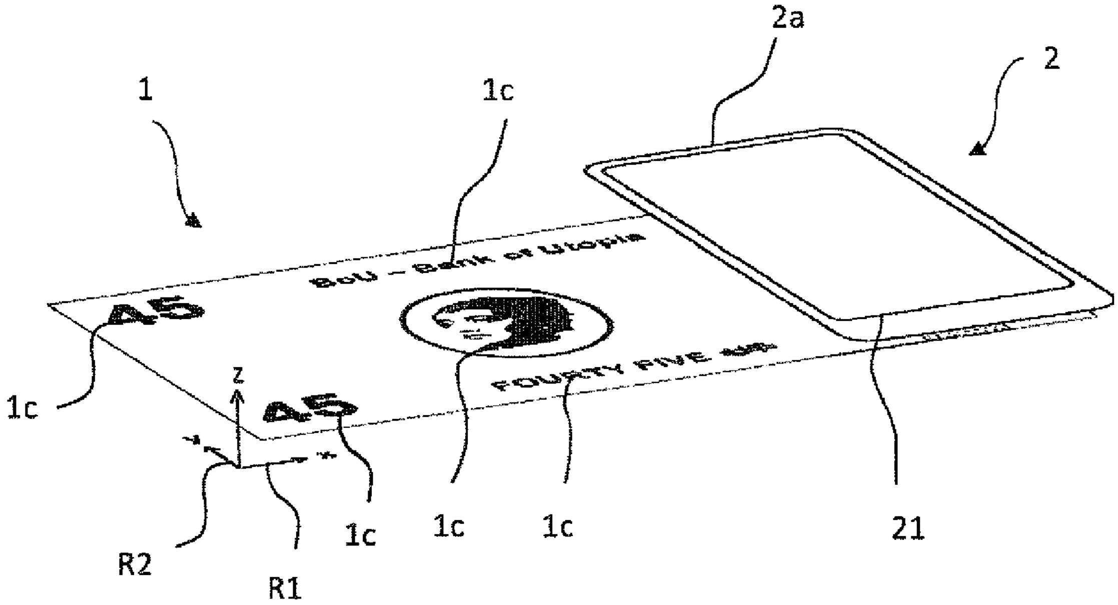
FIG. 5 a schematic representation of a security document and a device

FIG. 5 shows a perspective representation of the position of the device 2 perpendicularly over the security document 1 when step d is performed.

The security document 1 shown in FIG. 5 here preferably corresponds to the security document 1 shown in FIG. 2 and the device 2 shown in FIG. 5 here preferably corresponds to the device 2 shown in FIGS. 3 and 4. The security document 1 here comprises a first security element 1*a* and a second security element 1*b*.

Figure 6:
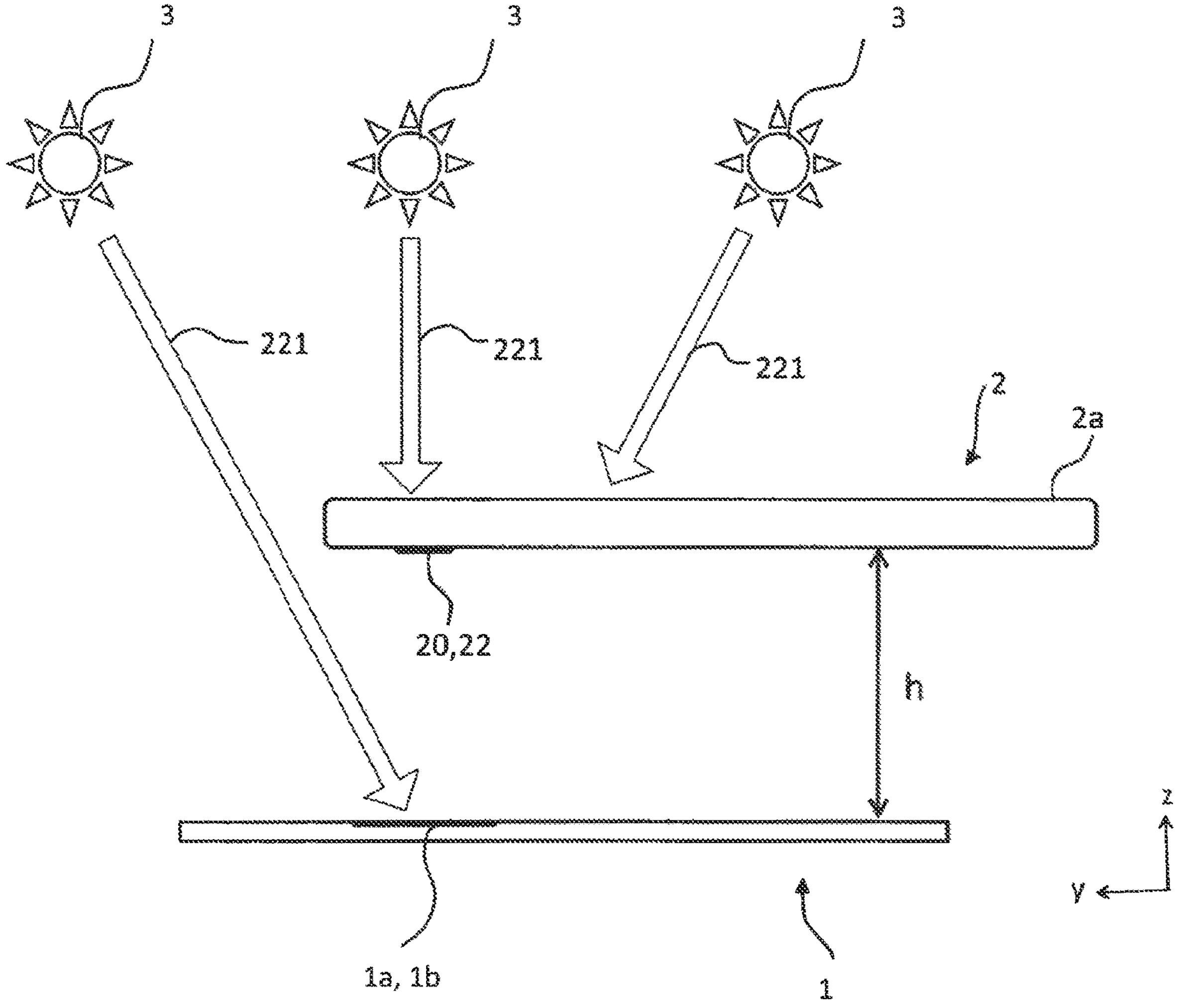
FIG. 6 a schematic representation of a security document and a device

FIG. 6 shows a side view of the implementation of step d shown in FIG. 5. The device 2 here is located at a distance h from the security document 1 under a second illumination 221 emitted by external light sources 3 according to step d.

The sensor 20 of the device 2 and/or the device 2 in steps c, d and/or e preferably has a distance h and/or an average distance from the security document 1 and/or the first security element 1*a* and/or the second security element 1*b* of from 20 mm to 150 mm, in particular from 50 mm to 130 mm, preferably from 60 mm to 125 mm.

The shielding surface 2*a* of the device 2 shields the security document 1 or the first and second security elements 1*a*, 1*b* from a portion of the second, in particular directed, illumination 221. In particular, only the portion of the second illumination 221 which preferably does not generate an optical effect in the direction of the sensor 20 reaches the second security element 1*b*, with the result that in particular no third items of optical information from the second security element 1*b* are capturable for the sensor 20. The security document 1 and/or the second security element 1*b* here are preferably illuminated from the field of view of the sensor substantially with diffusely reflected and/or scattered ambient light.

Here, tests have shown that the smaller the distance h is, the better the shielding action of the device 2 is. On the other hand, the distance must in particular not be too small, in order that the sensor 20 can still focus. The typical range for the distance h is therefore, for example, between 20 mm and 150 mm, preferably between 50 mm and 130 mm, further preferably between 60 mm and 125 mm.

It is further possible for the second illumination during the capture of the second items of optical information of the second security element 1*b* in step d to be diffuse, in particular wherein the diffuse second illumination comprises diffuse portions of the light of the external light sources 3 in the environment of the security document 1 and/or of the second security element 1*b*, in particular at a distance to at least 0.3 m, preferably 1 m, further preferably 5 m, from the security document 1 and/or from the second security element 1*b*, and/or in particular wherein the diffuse second illumination comprises ambient light and/or background light.

In particular, the device 2 and/or the shielding surface 2*a* of the device 2 is arranged during the capture of the second items of optical information of the second security element 1*b* in step d such that the device 2 and/or the shielding surface 2*a* of the device 2 shields against at least 75%, in particular at least 90%, preferably at least 95%, further preferably at least 99%, of directed portions of the light of the external light sources 3 in the environment of the security document 1 and/or of the second security element 1*b*.

It is advantageous that the device 2 and/or the shielding surface 2*a* of the device 2 is arranged during the capture of the second items of optical information of the second security element 1*b* in step d such that the device 2 and/or the shielding surface 2*a* of the device 2 shields the security document 1 and/or the second security element 1*b* from at least 75%, in particular at least 90%, preferably at least 95%, further preferably at least 99%, of directed portions of the light of the external light sources 3 at a distance of at least 0.3 m, preferably of at least 1 m, further preferably of at least 5 m.

Figure 7:
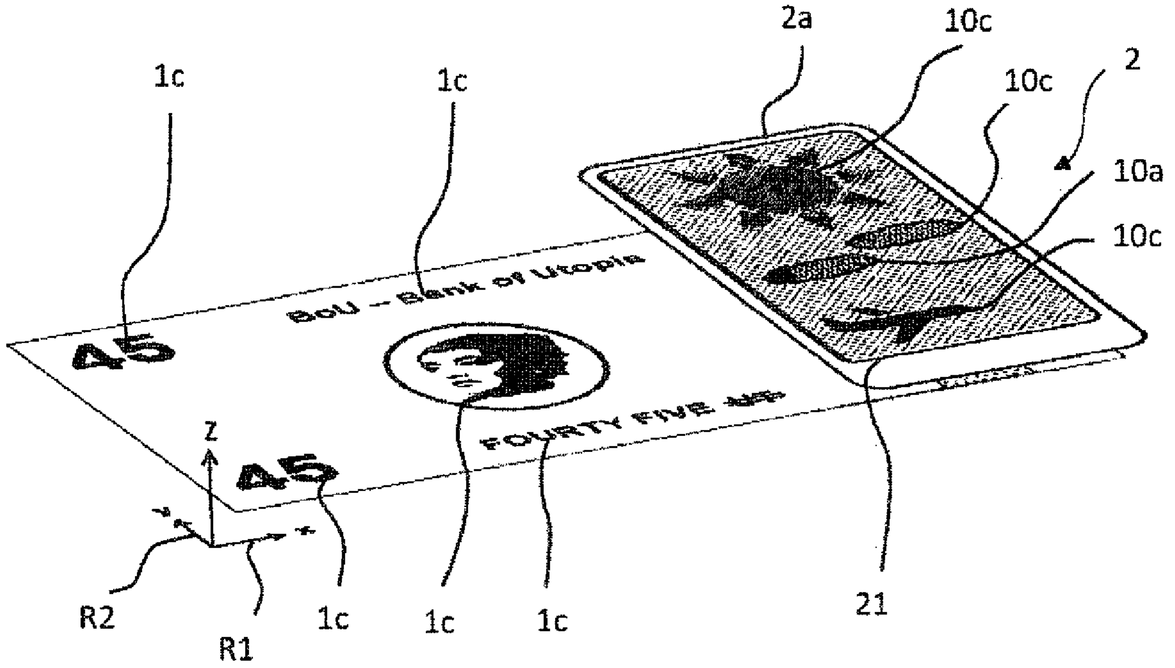
FIG. 7 a schematic representation of a security document and a device

FIG. 7 shows a perspective view of the implementation of step d shown in FIG. 6. The device 2 here is located at a distance h from the security document 1 under a second illumination 221 emitted by external light sources 3 according to step d. Here, the section of the security document 1 displayed by the output unit 21 of the device 2 comprises a reproduction of some security elements 10*c* as well as a reproduction of the first security element 10*a*.

Figure 8:
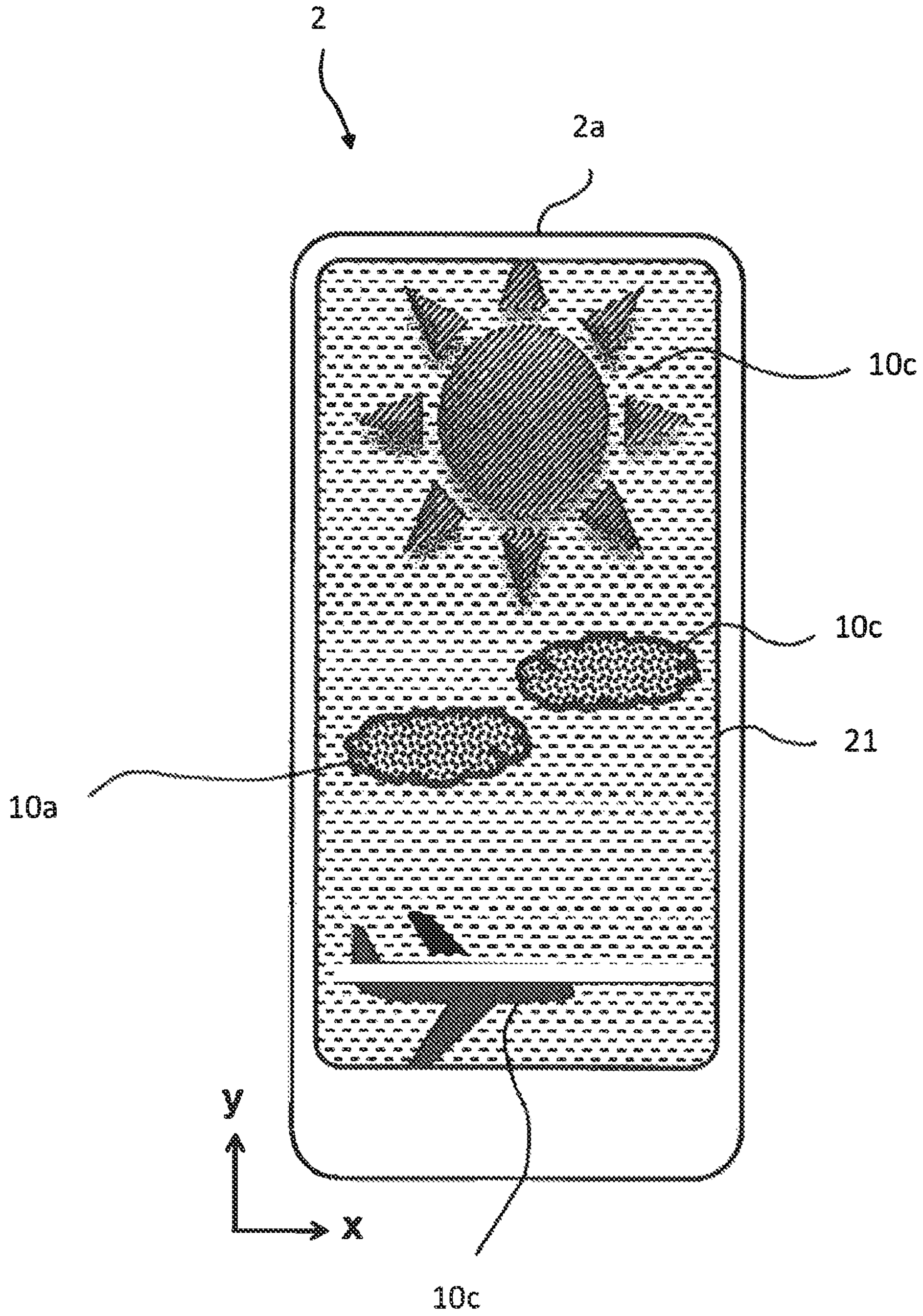
FIG. 8 a schematic representation of a device

FIG. 8 shows the device 2 shown in FIG. 3, except that the output unit 21 reproduces the section of the security document 1 captured by the sensor 20. Here, the section of the security document 1 displayed by the output unit 21 of the device 2 comprises a reproduction of some security elements 10*c* as well as a reproduction of the first security element 10*a*. The second security element 1*b* is not reproduced by the output unit 21 here, as the sensor 20 cannot capture the second security element 1*b* under the second, in particular diffuse, illumination 221.

It is preferably checked here whether the security element not capturable, under the second illumination, by the sensor of the device is not present as a permanently capturable security element, such as for example as a printed imitation.

Figure 9:
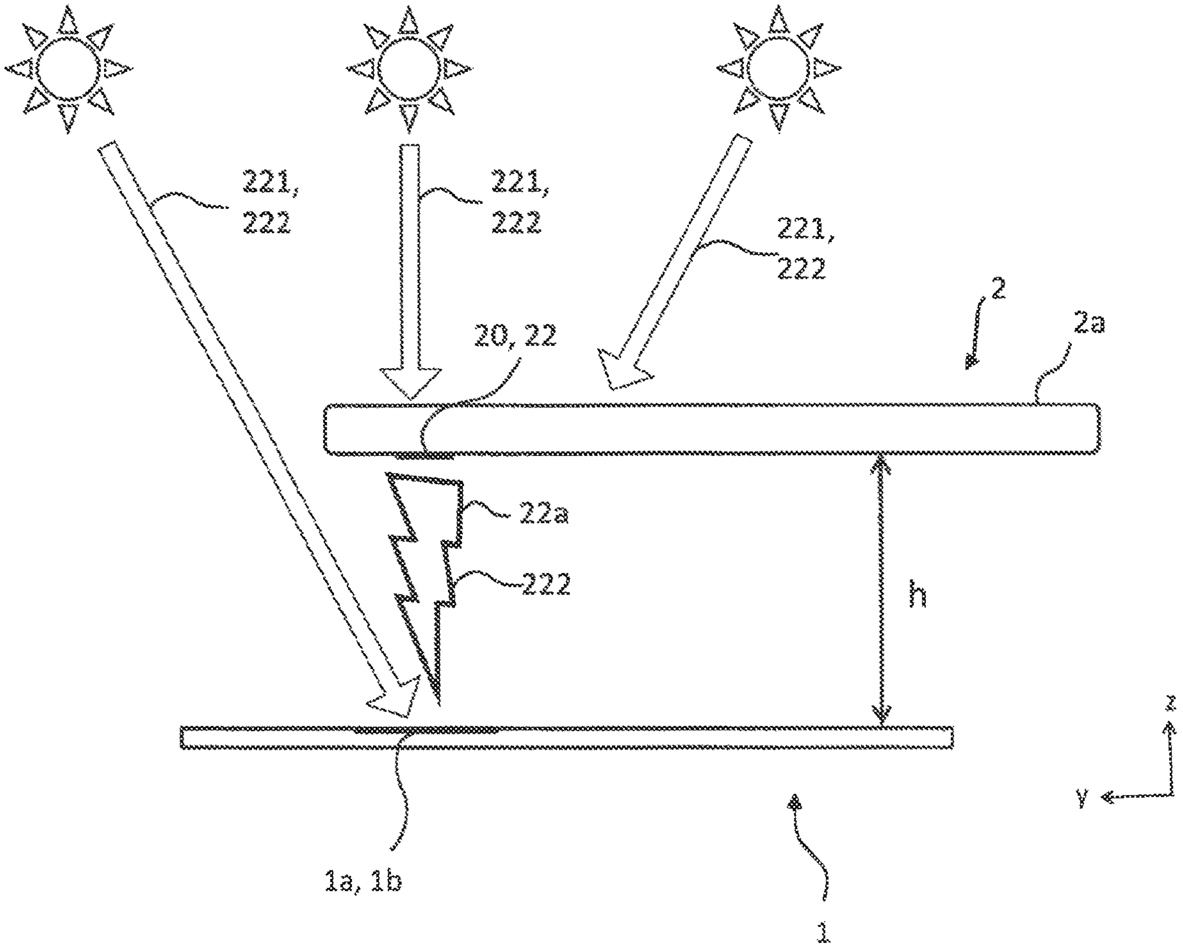
FIG. 9 a schematic representation of a security document and a device

FIG. 9 shows a side view of the implementation of step e comprising the security document 1 and the device 2. Here, FIG. 9 corresponds to FIG. 6, except that the internal light source 22 emits light 22*a*. Here, the second security element 1*b* and/or the security document 1 is shown under a third illumination 222.

In particular, the second illumination 221 shown in FIG. 6, which is preferably emitted by external light sources 3, is part of the third illumination 222, which preferably also comprises the light 22*a* emitted by the internal light source 22.

The shielding surface 2*a* of the device 2 shields the security document 1 or the first and second security elements 1*a*, 1*b* from a portion of the second, in particular directed, illumination 221, which is in particular included in the third illumination 222. In particular, the light 22*a* of the internal light source 22 as well as only a portion of the second illumination 221 reaches the second security element 1*b*, wherein an optical effect is preferably generated in the direction of the sensor 20, with the result that in particular third items of optical information from the second security element 1*b* are capturable for the sensor 20.

The second security element 1*b* is preferably designed such that it generates the third items of optical information, which in particular can be captured by the sensor 20 here and can be processed further by algorithms, in the case of almost perpendicular, directed light 22*a*, 222.

Further, it is possible for the directed light 22*a* from the internal light source 22 of the device 2 or the third illumination 222 from the internal light source 22 of the device 2 to be emitted at a solid angle smaller than or equal to 10°, in particular smaller than or equal to 5°, in particular wherein the average direction of propagation of the directed third illumination is aligned, in particular substantially, perpendicular to the plane spanned by the security document 1 and/or the first security element 1*a* and/or the second security element 1*b*.

It is also advantageous that the third illumination during the capture of the third items of optical information of the second security element 1*b* in step e is directed, in particular is emitted in a predetermined relative position or relative position change or relative position progression, at a predetermined distance, in particular the distance h, or distance change or distance progression and/or at a predetermined angle or angle change or angle progression between the device 2 and the security document 1 and/or the first and/or second security feature 1*a*, 1*b* during the capture of the first, second and/or third items of optical information.

It is further possible for the directed third illumination to be emitted by the internal light source 22 of the device 2, in particular wherein the direction of propagation of the directed third illumination is aligned, in particular substantially, perpendicular to the plane spanned by the security document 1 and/or the first security element 1*a* and/or the second security element 1*b*.

In particular, it is possible for the directed third illumination from the internal light source 22 of the device 2 to have a luminous intensity of from 5 lumens to 100 lumens, in particular from 5 lumens to 55 lumens, preferably of 50 lumens.

It is possible for the second items of optical information of the second security element 1*b* not to be captured by means of the sensor 20 of the device 2 in step e and/or in particular wherein the third items of optical information in step e differ from the second items of optical information in step d.

Further, it is possible for the third items of optical information of the second security element 1*b* in step e to comprise an item of optical and/or geometric information and/or for the third items of optical information of the second security element 1*b* in step e not to comprise the item of optical and/or geometric information.

Figure 10:
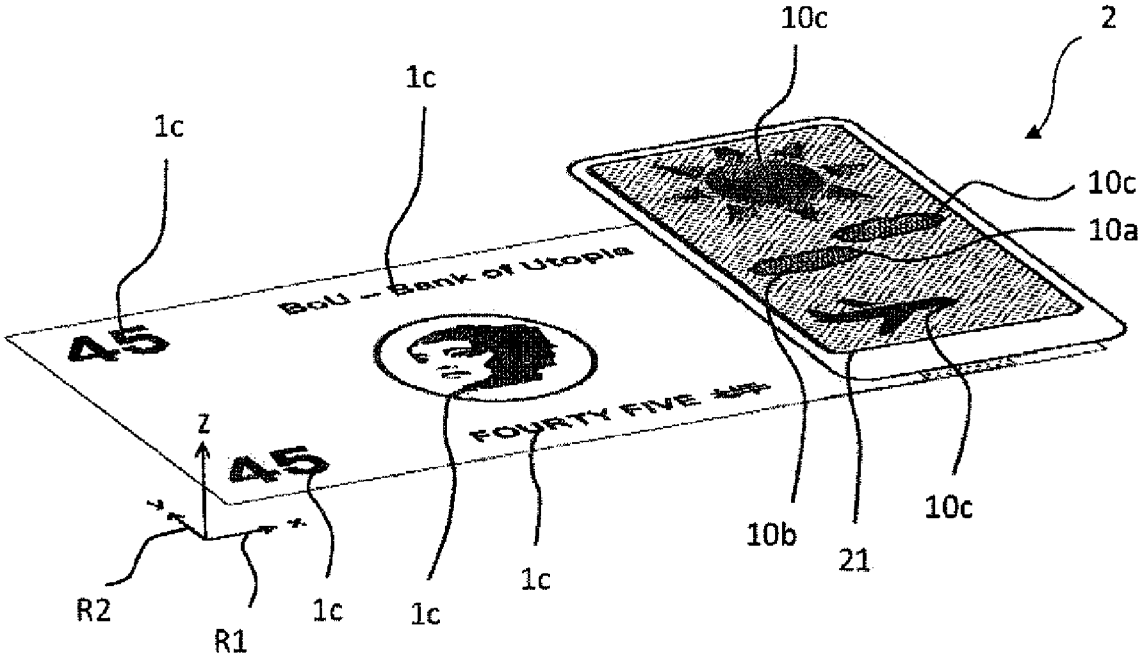
FIG. 10 a schematic representation of a security document and a device

FIG. 10 shows a perspective view of the implementation of step e comprising the security document 1 and the device 2. Here, FIG. 10 corresponds to FIG. 7, except that the internal light source 22 emits light 22*a*. Here, the second security element 1*b* and/or the security document 1 is shown under a third illumination 222.

Further, FIG. 10 shows that the device 2 here is located at a distance h from the security document 1 under a third illumination 222 emitted by external light sources 3 and by the internal light source 22 according to step d. Here, the section of the security document 1 displayed by the output unit 21 of the device 2 comprises a reproduction of some security elements 10*c* as well as a reproduction of the first security element 10*a* and the second security element 10*b*.

Figure 11:
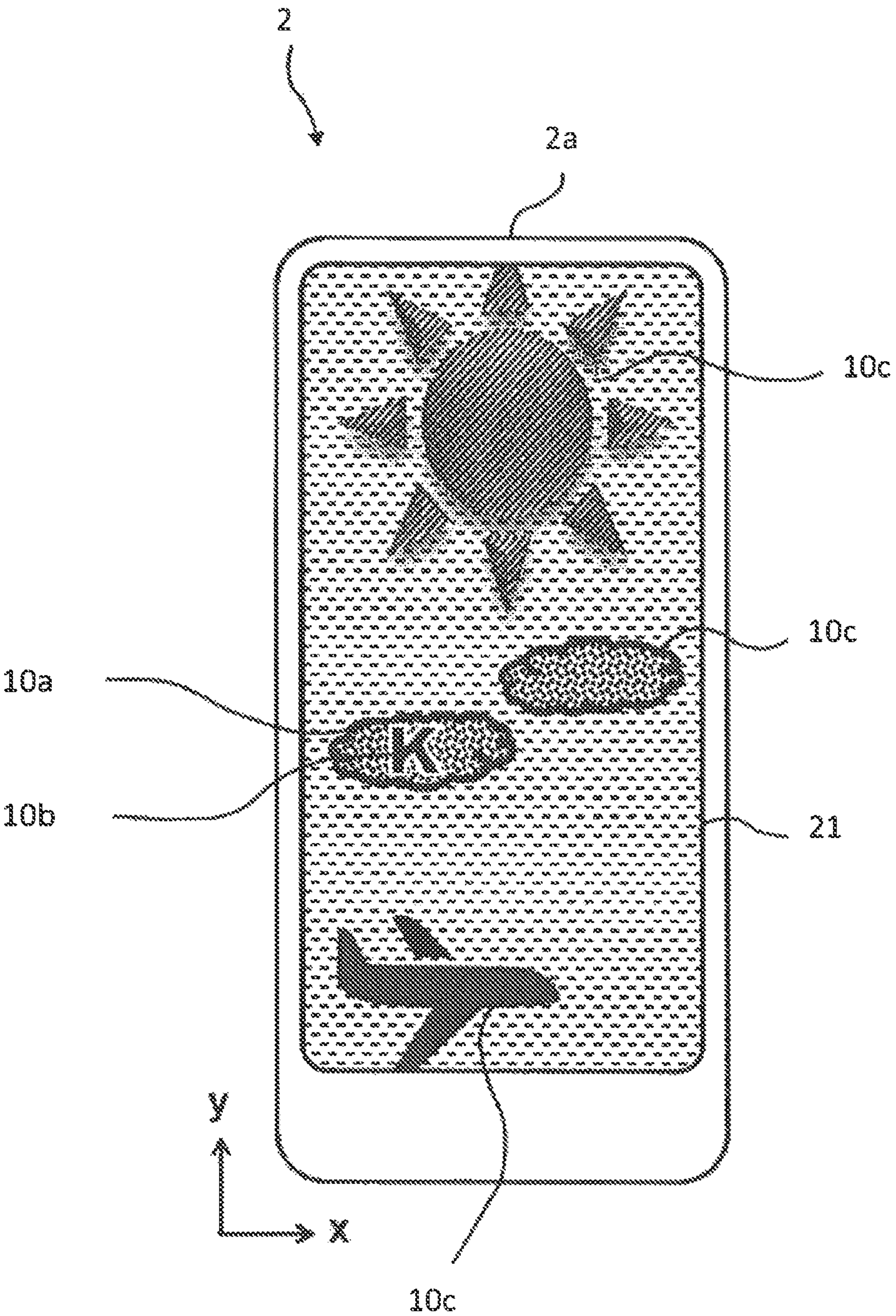
FIG. 11 a schematic representation of a device

FIG. 11 shows the device 2 shown in FIG. 8, except that the output unit 21 reproduces the section of the security document 1 captured by the sensor 20, which here also has a reproduction of the second security element 10*b* in the form of the letter "K". The second security element 10*b* is reproduced by the output unit 21 here, as the sensor 20 can capture the second security element 1*b* under the third, in particular directed, illumination 222.

It is possible for the second security element to have a border, which has a simple geometric figure, for example a cloud, circles, triangles, quadrangles, pentagons, stars, alphanumeric characters, country outline and/or icons or combinations thereof.

In particular, this simple geometric figure is sought by means of the sensor 20, the display unit 21 and/or the device 2 in a particular, predefined position, in particular in a superordinate pattern, on the security document 1. The internal light source is preferably activated after a successful search for such a simple geometric figure.

The third items of optical information can be captured for example as a light shape on a darker background or a dark shape on a light background.

The method, in particular step f, preferably comprises the following further step:

f1 outputting instructions and/or items of user information before and/or during the checking of the genuineness of the security document 1 and/or of the second security element 1*b*, at least on the basis of the at least one second dataset and the at least one third dataset, to a user by means of the device 2, in particular by means of the output unit 21 of the device 2, from which the user preferably comprehends the differences present or not present between the at least one second dataset or the second items of optical information and the at least one third dataset or the third items of optical information.

Figure 12:
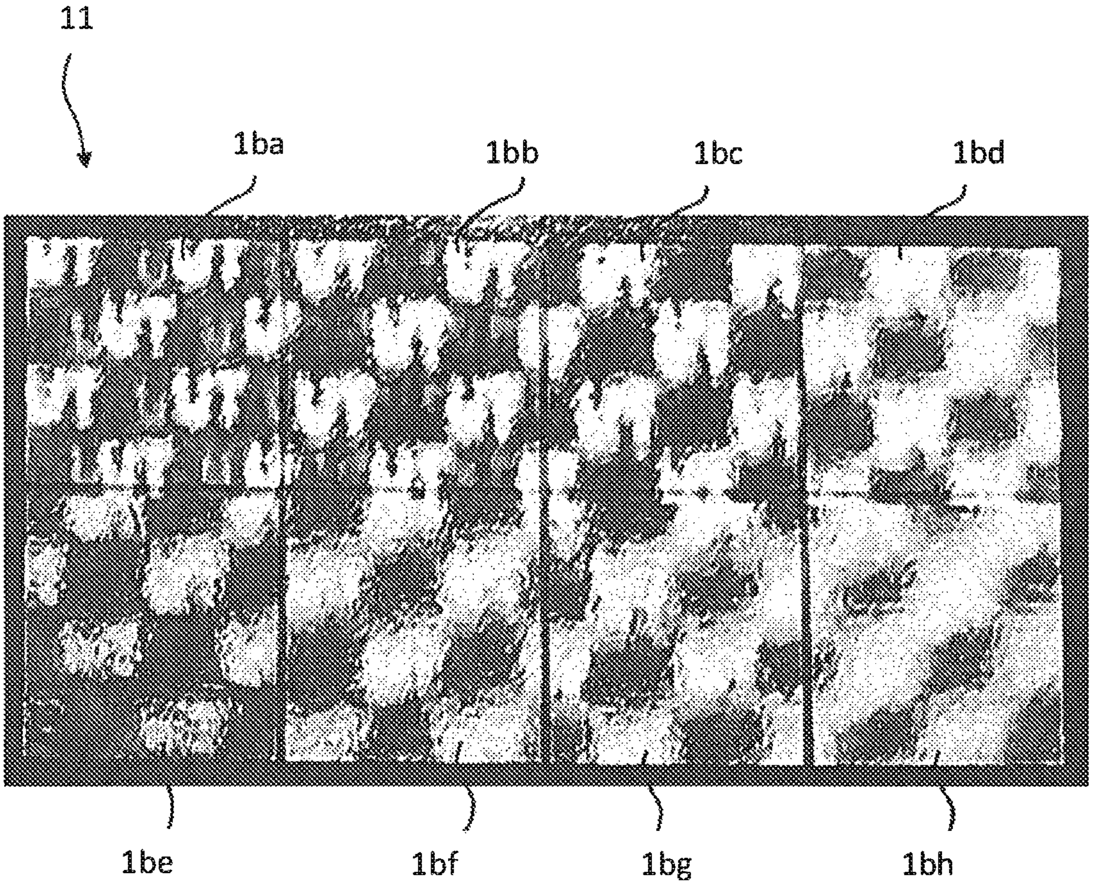
FIG. 12 a schematic representation of a security feature

FIG. 12 shows a security document 1, which is a test design. The test design comprises a total of eight regions, divided onto two rows each comprising four regions, wherein each region comprises in each case a computer-generated hologram as second security element 1*ba*-1*bh* and wherein each of the eight regions has a size of 10 mm×10 mm. Each of the computer-generated holograms is here based on an individual set of parameters. The computer-generated holograms are in each case aluminum-coated hologram structures which are applied to a banknote paper.

The parameters of the set of parameters of the computer-generated hologram in the top left region is chosen such that the third items of optical information of the second security element 1*ba* in the form of the letter sequence "UT" is represented sharpest. At the same time, this structure is in particular most susceptible here to the fact that the third items of optical information are generated in an undesired manner by a light source irradiating randomly in the direction of the second security element 1*ba*. As the reference numbers of the second security elements 1*ba* to 1*bh* continue, the sharpness of the third items of optical information represented decreases. The so-called virtual height of the third items of optical information represented by the respective computer-generated holograms increases from the second security element 1*ba* to the second security element 1*bh*, in the following sequence: 6 mm, 8 mm, 10 mm, 12 mm, 14 mm, 16 mm, 18 mm and 20 mm, wherein the solid angle is in each case constantly, in particular substantially, 25°.

The virtual height of a computer-generated hologram in a second security element preferably describes the height at which the third items of optical information appear to be capturable virtually, preferably with reference to the plane which is spanned by the second security element.

Here, tests have shown that the rougher the background is, the more washed-out the third items of optical information represented in the second security element are, in particular wherein, preferably for faultless detection or capture of the third items of optical information, the roughness Ra of the surface of the first and/or second security element and/or the security document and/or the substrate of the first and/or second security element and/or the security document lies between 0.1 μm and 10 μm, preferably between 0.1 μm and 5 μm, further preferably between 0.1 μm and 3 μm. The parameters of the computer-generated holograms are preferably chosen such that the third items of optical information is detectable or capturable on the provided substrate of the first and/or second security element and/or the security document with its roughness.

To adapt the computer-generated holograms to the roughness of the substrate or of the surface of the security document, wherein the roughness of the security document can also be present at least proportionately on the surface of the security element, two parameters are crucial in particular: for one thing, the virtual height of the computer-generated holograms which generate the third items of optical information under the third illumination, as well as, for another, the solid angle at which the third items of optical information are visible or detectable or capturable. The virtual height of a computer-generated hologram in a second security element preferably describes the height at which the third items of optical information appear to be capturable virtually, preferably with reference to the plane which is spanned by the second security element ($h_0=0$).

The virtual height of the third items of optical information can, in particular from an observer's or sensor's point of view, lie in front of this plane, in particular wherein the virtual height here has a positive amount. Such a positive amount of the virtual height of the third items of optical information generated by a computer-generated hologram can lie in the range of from 0.1 mm to 10 mm, preferably in the range of from 1 mm to 8 mm.

The virtual height of the third items of optical information can, in particular from an observer's or sensor's point of view, lie behind this plane, in particular wherein the virtual height here has a negative amount. Such a negative amount of the virtual height of the third items of information generated in a computer-generated hologram can lie in the range of from −0.1 mm to −10 mm, preferably in the range of from −1 mm to −8 mm. Furthermore, the virtual height of the third items of optical information can also lie in this plane, in particular wherein the amount of the virtual height is equal to zero.

By "solid angle" is preferably meant here the angle which spans the light cone under which the third items of optical information are visible or capturable in the case of perpendicular illumination of the second security element and/or security document.

Here, tests have shown that the smaller the chosen solid angle is, the smaller the danger is that the sensor of the device will unintentionally record the third items of optical information possibly generated by a light source other than the internal light source of the device. In particular, at the same time, it becomes more difficult to carry out step e of the method here, as the third items of optical information are recognizable or capturable in the case of illumination with the internal light source of the device at an ever narrower solid angle. In particular, it has proved to be advantageous here if the solid angle lies in the range of from 10° to 40°.

Further, it has proved to be advantageous if the third items of optical information represent a negative shape, in particular a dark shape on a light background.

Figure 13:
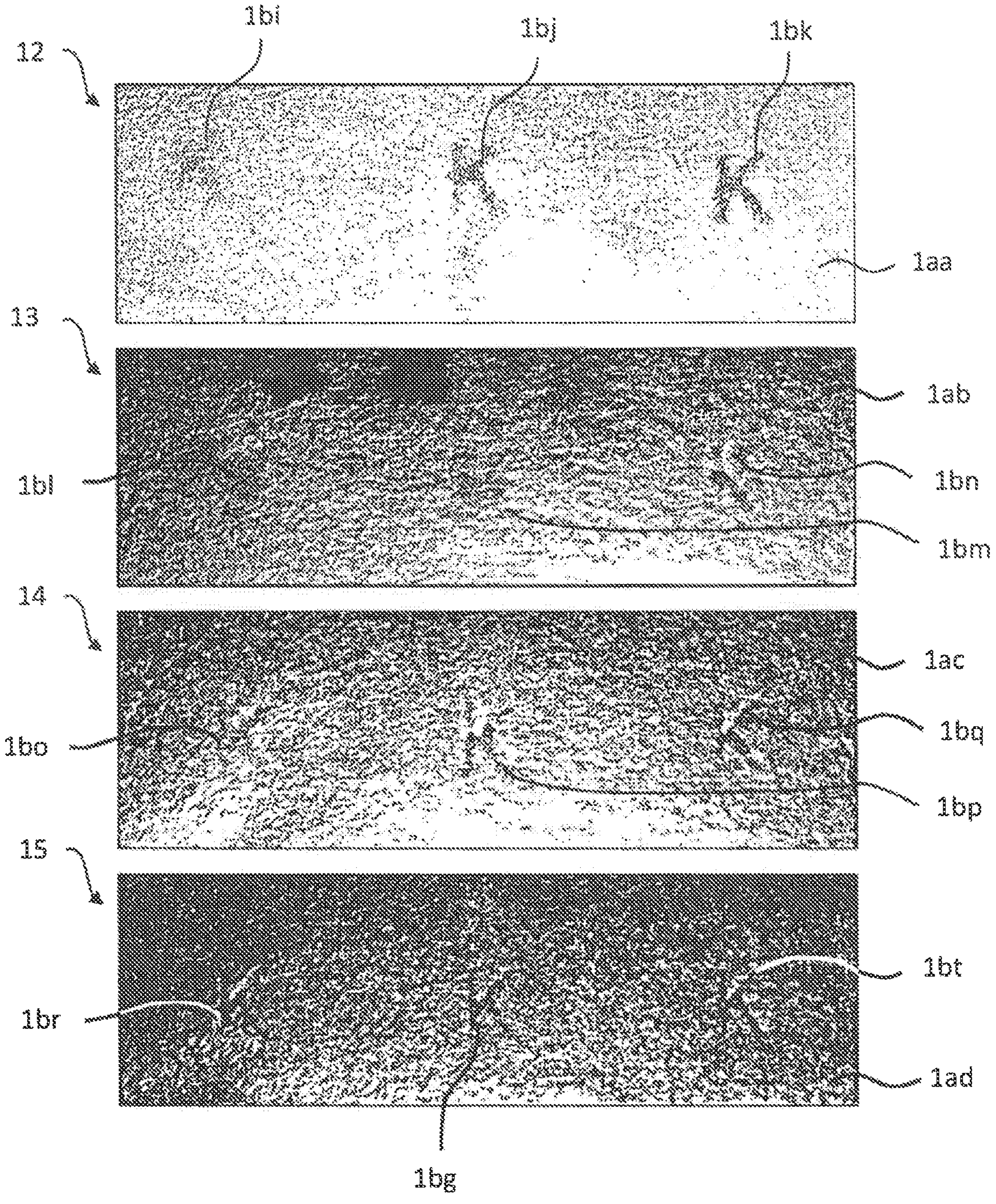
FIG. 13 a schematic representation of a security feature

FIG. 13 shows four security documents 12 to 15 as test designs on rough banknote paper, wherein each of these security documents has a first security element 1*aa* to 1*ad* and in each case three second security elements 1*bi*, 1*bj*, 1*bk* to 1*br*, 1*bs*, 1*bt*. The second security elements 1*bi*, 1*bj*, 1*bk* to 1*br*, 1*bs*, 1*bt* are computer-generated holograms here. The third items of optical information are recognizable or capturable as the letter "K", wherein the letter appears dark and the background appears light.

The virtual heights and the solid angles have the following values for the respective second security elements in FIG. 13:

Second security element 1*bi*: Virtual height: 8 mm/Solid angle: 25°

Second security element 1*bj*: Virtual height: 6 mm/Solid angle: 25°

Second security element 1*bk*: Virtual height: 4 mm/Solid angle: 25°

Second security element 1*bl*: Virtual height: 8 mm/Solid angle: 10°

Second security element 1*bm*: Virtual height: 6 mm/Solid angle: 10°

Second security element 1*bn*: Virtual height: 4 mm/Solid angle: 10°

Second security element 1*bo*: Virtual height: 8 mm/Solid angle: 5°

Second security element 1*bp*: Virtual height: 6 mm/Solid angle: 5°

Second security element 1*bq*: Virtual height: 4 mm/Solid angle: 5°

Second security element 1*br*: Virtual height: 8 mm/Solid angle: 2.5°

Second security element 1*bs*: Virtual height: 6 mm/Solid angle: 2.5°

Second security element 1*bt*: Virtual height: 4 mm/Solid angle: 2.5°

LIST OF REFERENCE NUMBERS

1 security document
11, 12, 13, 14, 15 security document
1*a* first security element
1*aa*, 1*ab*, 1*ac*, 1*ad* first security element
1*b* second security element
1*ba*, 1*bb*, 1*bc*, 1*bd* second security element
1*be*, 1*bf*, 1*bg*, 1*bh* second security element
1*bi*, 1*bj*, 1*bk*, 1*bl* second security element
1*bm*, 1*bn*, 1*bo*, 1*bp* second security element
1*bq*, 1*br*, 1*bs*, 1*bt* second security element
1*c* security element
1*d* foil strip
10*a* reproduction of a first security element
10*b* reproduction of a second security element
10*c* reproduction of a security element
2 device
2*a* shielding surface
2*b* outline
20 sensor
21 output unit
22 internal light source
22*a* light
220 first illumination
221 second illumination
222 third illumination
3 external light source
X, Y direction
R1 first direction
R2 second direction
a, b, c, d, e, f method step

The invention claimed is:

1. A method for authenticating a security document by means of at least one device, wherein in the method the following steps are carried out:

a) providing the security document comprising at least one first security element and at least one second security element, b) providing the at least one device, wherein the at least one device comprises at least one sensor, c) capturing first items of optical information of the at least one first security element by means of the at least one sensor of the at least one device during a first illumination, the first illumination comprising a portion of light falling substantially perpendicularly on the at least one first security element, wherein at least one first dataset specifying these items of information is generated therefrom, d) shielding the first illumination used during the capturing of the first items of optical information with the at least one device such that the portion of light falling substantially perpendicularly on the at least one first security element of the first illumination is substantially blocked by the at least one device to provide a second illumination on the at least one second security element, the second illumination consisting essentially of a remainder of the first illumination not blocked by the at least one device, e) capturing second items of optical information of the at least one second security element by means of the at least one sensor of the at least one device during the second illumination, wherein at least one second dataset specifying these items of information is generated therefrom, f) activating an internal light source of the at least one device to provide a third illumination, the third illumination comprising the second illumination plus light from the internal light source falling substantially perpendicularly on the at least one second security element, g) capturing third items of optical information of the at least one second security element by means of the at least one sensor of the at least one device during the third illumination, wherein at least one third dataset specifying these items of information is generated therefrom, wherein the second illumination differs from the third illumination, h) checking the genuineness of the security document and/or the at least one second security element at least on the basis of the at least one second dataset and the at least one third dataset, wherein the at least one second security element only generates the third items of optical information when subjected to the light from the internal light source falling substantially perpendicularly on the at least one second security element, and wherein the second items of optical information of the at least one second security element are not captured by means of the at least one sensor of the at least one device during the capturing the third items of optical information from the at least one second security element, and wherein the at least one device in step b) is selected from: smartphone, tablet, spectacles and/or PDA, wherein the at least one device has a lateral dimension in a first direction (X) of from 50 mm to 200 mm, and/or has a second lateral dimension in a second direction (Y) of from 100 mm to 250 mm, and wherein the first lateral dimension in the first direction (X) and the second lateral dimension in the second direction (Y) of the at least one device in step b) span at least one shielding surface, and wherein the at least one shielding surface of the at least one device in step b) shields the security document and/or the at least one first security element and/or the at least one second security element from diffuse illumination and/or background illumination.

2. The method according to claim 1, wherein the at least one shielding surface has an outline in the plane spanned by the first direction (X) and the second direction (Y).

3. The method according to claim 1, wherein the at least one sensor of the at least one device in step b) is an optical sensor.

4. The method according to claim 1, wherein the at least one sensor of the at least one device in step b) has a distance and/or an average distance and/or minimum distance from the outline of the at least one shielding surface of from 3 mm to 70 mm.

5. The method according to claim 1, wherein the at least one sensor of the at least one device in step b) has a distance and/or an average distance from the at least one internal light source of the at least one device of from 5 cm to 20 cm.

6. The method according to claim 1, wherein the at least one device in step b) comprises at least one output unit.

7. The method according to claim 1, wherein the method comprises the following further step:

b1) outputting instructions and/or items of user information before and/or during the capture of the first, second and/or third items of optical information of the at least one first or second security element in steps c), d) or e) to a user by means of the at least one device.

8. The method according to claim 1, wherein the method comprises the following further step:

b2) outputting instructions and/or items of user information before and/or during the capture of the second and/or third items of optical information of the at least one first or second security element in steps d) or e), at least on the basis of the at least one first dataset and/or the at least one second dataset, to a user by means of the at least one device.

9. The method according to claim 1, wherein the second illumination during the capture of the second items of optical information of the at least one second security element in step d) is diffuse.

10. The method according to claim 1, wherein the at least one device and/or the at least one shielding surface of the at least one device is arranged during the capture of the second items of optical information of the at least one second security element in step d) such that the at least one device and/or the at least one shielding surface of the at least one device shields against at least 75% of directed and/or diffuse portions of the light of all external light sources in the environment of the security document and/or of the at least one second security element.

11. The method according to claim 1, wherein the at least one device and/or the at least one shielding surface of the at least one device is arranged during the capture of the second items of optical information of the at least one second security element in step d) such that the at least one device and/or the at least one shielding surface of the at least one device shields the security document and/or the at least one second security element from at least 75% of directed and/or diffuse portions of the light of all external light sources at a distance of at least 0.3 m.

12. The method according to claim 1, wherein the directed third illumination is emitted by the at least one internal light source of the at least one device at a solid angle smaller than or equal to 10°.

13. The method according to claim 1, wherein the directed third illumination from the at least one internal light source of the at least one device has a luminous intensity of from 5 lumens to 100 lumens.

14. The method according to claim 1, wherein the third items of optical information of the at least one second security element in step e) comprise an item of optical and/or geometric information and/or wherein the third items of optical information of the at least one second security element in step e) do not comprise the item of optical and/or geometric information.

15. The method according to claim 1, wherein the method comprises the following further step:

f1) outputting instructions and/or items of user information before and/or during the checking of the genuineness of the security document and/or of the at least one second security element, at least on the basis of the at least one second dataset and the at least one third dataset, to a user by means of the at least one device.

16. The method according to claim 1, wherein the at least one first security element (in step a) is selected from: barcode, QR code, alphanumeric characters, numbering, hologram, print, barcode, QR code, number, hologram or kinegram design and/or printed design of a product or combinations thereof.

17. The method according to claim 1, wherein the at least one second security element in step a) comprises at least asymmetrical structures, holograms, micromirrors, matte structures, kinegram, blazed gratings, diffraction structures, mirror surfaces, microlenses, and/or combinations of these structures.

18. The method according to claim 1, wherein the at least one second security element in step a) comprises computer-generated holograms, and wherein the virtual height of the computer-generated holograms generate the third items of optical information under the third illumination.

19. The method according to claim 1, wherein the method comprises the following further step:

b1) outputting instructions and/or items of user information before and/or during the capture of the first, second and/or third items of optical information of the at least one first or second security element in steps c), d) or e) to a user by means of the at least one device, from which the user infers a predetermined relative position or relative position change or relative position progression, a predetermined distance, or distance change or distance progression and/or a predetermined angle or angle change or angle progression between the at least one device and the security document and/or the at least one first and/or the at least one second security feature during the capture of the first, second and/or third items of optical information.

20. The method according to claim 1, wherein the method comprises the following further step:

b2) outputting instructions and/or items of user information before and/or during the capture of the second and/or third items of optical information of the at least one first or second security element in steps d) or e), at least on the basis of the at least one first dataset and/or the at least one second dataset, to a user by means of the at least one device, from which the user infers a predetermined relative position or relative position change or relative position progression, a predetermined distance, or distance change or distance progression and/or a predetermined angle or angle change or angle progression between the at least one device and the security document and/or the at least one first and/or the at least one second security feature during the capture of the second and/or third items of optical information.

* * * * *